US012586778B2

(12) United States Patent
Cevik et al.

(10) Patent No.: US 12,586,778 B2
(45) **Date of Patent: *Mar. 24, 2026**

(54) SUPERCAPACITOR WITH NiO/Fe₂VO₄ELECTRODE

(71) Applicant: Imam Abdulrahman Bin Faisal University, Dammam (SA)

(72) Inventors: Emre Cevik, Dammam (SA); Ayhan Bozkurt, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/352,537

(22) Filed: Oct. 8, 2025

(65) Prior Publication Data

US 2026/0038810 A1 Feb. 5, 2026

Related U.S. Application Data

(63) Continuation of application No. 18/152,529, filed on Jan. 10, 2023, now Pat. No. 12,469,843.

(51) Int. Cl.
*H01G 9/00* (2006.01)
*H01G 11/00* (2013.01)
(Continued)

(52) U.S. Cl.
CPC ......... *H01M 4/364* (2013.01); *H01M 4/0404* (2013.01); *H01M 4/623* (2013.01);
(Continued)

(58) Field of Classification Search
None
See application file for complete search history.

(56) References Cited

U.S. PATENT DOCUMENTS 10,056,199 B2 8/2018 Dunn et al.
10,217,571 B2 2/2019 Xing
(Continued)

FOREIGN PATENT DOCUMENTS

CN 102891316 A * 1/2013
CN 109904001 A 6/2019
(Continued)

OTHER PUBLICATIONS

Meng Guo, et al., "High-energy solid-state asymmetric supercapacitor based on nickel vanadium oxide/NG and iron vanadium oxide/NG electrodes", Applied Catalysis B: Environmental, vol. 239, Dec. 30, 2018, pp. 290-299 (Abstract only).
(Continued)

*Primary Examiner* — Timothy J. Dole
*Assistant Examiner* — Esther N Lian
(74) *Attorney, Agent, or Firm* — Oblon, McClelland, Maier & Neustadt, L.L.P.

(57) ABSTRACT

A nanocomposite electrode including a substrate, a binding compound, a conductive additive, and NiO/Fe₂VO₄ nanoparticles. The NiO/Fe₂VO₄ nanoparticles have a substantially spherical shape. A mixture of the binding compound, the conductive additive and the NiO/Fe₂VO₄ nanoparticles, is at least partially coated on a first surface of the substrate. A method of making the NiO/Fe₂VO₄ nanoparticles is described.

16 Claims, 28 Drawing Sheets

(51) Int. Cl.

| | |
|---|---|
| *H01M 4/04* | (2006.01) |
| *H01M 4/36* | (2006.01) |
| *H01M 4/62* | (2006.01) |
| *H01M 10/0565* | (2010.01) |
| *H01M 4/02* | (2006.01) |

(52) U.S. Cl.
CPC ....... *H01M 4/625* (2013.01); *H01M 10/0565* (2013.01); *H01M 2004/021* (2013.01); *H01M 2300/0082* (2013.01)

(56) References Cited

U.S. PATENT DOCUMENTS

| | | | |
|---|---|---|---|
| 12,469,843 B2 * | 11/2025 | Cevik | ................... H01M 4/623 |
| 2012/0153887 A1 | 6/2012 | Risser et al. | |

FOREIGN PATENT DOCUMENTS

| | | | | |
|---|---|---|---|---|
| CN | 112768679 A | * | 5/2021 | ........ H01M 10/0525 |
| CN | 116960294 A | * | 10/2023 | ............ H01M 4/366 |
| KR | 20200001212 A | * | 1/2020 | ............ H01M 4/131 |

OTHER PUBLICATIONS

Hongchun Mu, et al., "Strong physisorption and superb thermal stability of carbon nanofibers carried $Cu_xO$—$V_2O_5$ enabling the flexible and long-cycling supercapacitor", Journal of Alloys and Compounds, vol. 775, Feb. 15, 2019, pp. 872-882 (Abstract only).
Jing Peng, et al., "A versatile route to metal oxide nanoparticles impregnated in carbon matrix for electrochemical energy storage", Chemical Engineering Journal, vol. 404, Article No. 126461, Jan. 15, 2021, 2 pages (Abstract only).

* cited by examiner

| ⚛ | 9/28/2020 11:57:52 AM | HV 10.00 kV | WD 4.0 mm | mag ☐ 14 995 x | det ETD | tilt 0.0 ° | HFW 27.6 µm | �muⒶ10 µmⒷ Helios |

| ⚛ | 9/28/2020 11:17:29 AM | HV 15.00 kV | WD 4.0 mm | mag ☐ 19 978 x | det ETD | tilt 0.0 ° | HFW 10.4 µm | ⊢4 µm⊣ Helios |

| SEM MAG: 4.00 kx | WD: 10.69 mm | ⊔⊔⊔⊔⊔⊔⊔⊔ VEGA3 TESCAN |
|---|---|---|
| View field: 34.6 μm | Det: SE | 10 μm |
| Date(m/d/y): 12/07/20 | | Performance in nanospace |

| SEM MAG: 4.00 kx | WD: 10.69 mm | ⊥⊥⊥⊥⊥⊥⊥⊥ VEGA3 TESCAN |
| View field: 34.6 µm | Det: SE | 10 µm |
| Date(m/d/y): 12/07/20 | | Performance in nanospace |

C K - 83.8%

V K - 2.2%

Fe K - 6.8%

Ni K - 7.2%

Area 75 - Live Map 1 | V K_ROI (2)

10 μm          Mag:7811          WD : 11

Area 75 - Live Map 1 | C K_ROI (8)

10 μm          Mag:7811          WD : 11

Area 75 - Live Map 1 | FeK_ROI (3)

10 μm     Mag:7811     WD : 11

Area 75 - Live Map 1 | NiK_ROI (2)

10 μm     Mag:7811     WD : 11 flat

60°

150°

SUPERCAPACITOR WITH
NiO/Fe$_2$VO$_4$ ELECTRODE

CROSS-REFERENCE TO RELATED APPLICATIONS

The present application is a Continuation of U.S. application Ser. No. 18/152,529, now allowed, having a filing date of Jan. 10, 2023.

STATEMENT OF ACKNOWLEDGEMENT

The Authors extend their appreciation to Deputyship for Research & Innovation, Ministry of Education in Saudi Arabia for funding this research work.

BACKGROUND

Technical Field

The present disclosure is directed to a nanocomposite electrode, and particularly, to a nanocomposite electrode, including NiO/Fe$_2$VO$_4$ nanoparticles.

Description of Related Art

The "background" description provided herein is to generally present the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, there has been an escalating requirement for higher power and energy densities because of the rapidly growing market of hybrid electric vehicles and portable electronic devices. The currently dominating energy storage devices (ESDs) are batteries and supercapacitors however, batteries demonstrate limited cycle performance and power density. Supercapacitors are considered more favorable and efficient than batteries because of their fast charge and discharge rate, high specific power, and long-life cycle. However, supercapacitors have higher self-discharge rates than batteries and bear low energy densities. Although several factors play a role in the performance of supercapacitors, such as electrode material, voltage range, electrolyte, etc., it is widely reported that the performance of electrochemical supercapacitors is mainly determined by the electrode materials. Hence, by improving the structure of materials, the electrochemical performance of electrodes can be improved.

A suitable electrode material should have high specific capacitance, low resistance, high surface area, and high chemical and thermal stability. Cost-effectiveness and material toxicity should also be considered. Traditional materials used for electrodes in supercapacitors include conductive polymers, carbon materials, transition metal oxides, and hydroxides. However, the performance of such single material-based electrodes does not meet the challenges of a high-quality supercapacitor, as the materials are prone to several performance and structure defects. Developing a new composite material by combining two or more materials can achieve enhanced electrochemical performances due to corresponding microstructures.

Iron, nickel, and vanadium-based nanocomposites have been reported as electrode materials with enhanced redox behaviors, charge capacity and electrical conductivity. However, insufficient research has been reported regarding metal-based nanocomposites with more than two metals. Accordingly it is one object of the present disclosure to provide an electrode including a nanocomposite. It is another object of the present disclosure to provide a nanocomposite of 3 metals. It is another object of the present disclosure to provide a supercapacitor with a high capacitance.

SUMMARY

In an exemplary embodiment, a nanocomposite electrode is described. The nanocomposite electrode includes a substrate, a binding compound, a conductive additive, and NiO/Fe$_2$VO$_4$ nanoparticles. The NiO/Fe$_2$VO$_4$ nanoparticles have a substantially spherical shape. A mixture of the binding compound, the conductive additive, and the NiO/Fe$_2$VO$_4$ nanoparticles, is at least partially coated on a first surface of the substrate.

In some embodiments, the NiO/Fe$_2$VO$_4$ nanoparticles have an average diameter of 1-20 nanometers (nm).

In some embodiments, the NiO/Fe$_2$VO$_4$ nanoparticles are aggregated and have an average aggregate size of 1 to 50 micrometers ($\mu$m).

In some embodiments, the NiO/Fe$_2$VO$_4$ nanoparticles are aggregated and form an interconnected chain.

In some embodiments, the NiO/Fe$_2$VO$_4$ nanoparticles form an interconnected chain while dispersed in a matrix of the conductive additive.

In some embodiments, the mixture includes of 5-10 wt. % of the binding compound, 70-90 wt. % of the conductive additive, and 1-20 wt. % of the NiO/Fe$_2$VO$_4$ nanoparticles, based on a total weight of the mixture.

In some embodiments, the mixture includes 70-90 wt. % C, 0.5-5 wt. % V, 1-10 wt. % Fe, and 1-10 wt. % Ni based on the total weight of the mixture.

In some embodiments, the elements V, C, Fe, and Ni are homogeneously distributed on the first surface of the substrate.

In some embodiments, the substrate is made from at least one material selected from the group consisting of stainless steel, aluminum, nickel, copper, platinum, zinc, tungsten, and titanium.

In some embodiments, the conductive additive is at least one selected from the group consisting of graphite, activated carbon, reduced graphene oxide, carbon nanotubes, carbon nanofibers, and carbon black.

In some embodiments, the binding compound is at least one selected from the group consisting of polyvinylidene fluoride (PVDF) and N-methyl pyrrolidone (NMP).

In some embodiments, the first surface of the substrate is hydrophilic.

In some embodiments, the first surface of the substrate has a water contact angle less than 37°.

In another exemplary embodiment, a supercapacitor device is described. The supercapacitor device includes two symmetrically facing nanocomposite electrodes. The first surfaces coated with the mixture face inwards. The supercapacitor device includes an electrolyte which is disposed between and is in contact with the first surfaces.

In some embodiments, the electrolyte is a gel electrolyte.

In some embodiments, the electrolyte is a glycerol/KOH gel electrolyte.

In some embodiments, the electrolyte is anhydrous.

In some embodiments, the supercapacitor device has a specific capacitance of 250-300 Farad per gram (F/g) at a current density of 1-5 ampere per gram (A/g).

In some embodiments, a battery includes 2-10 of the supercapacitor devices connected in parallel and/or series.

In some embodiments, a method of making the NiO/Fe$_2$VO$_4$ nanoparticles includes mixing an iron salt, a nickel salt, and a vanadium salt in water to form an aqueous solution. A molar ratio of the iron salt, the nickel salt, and the vanadium salt is 1-10 to 1-10 to 1-10. The method includes sonicating the aqueous solution for at least 5 minutes to form a homogeneous solution. The method further includes adding a base while sonicating the homogeneous solution to form a precipitate slurry. Furthermore, the method includes heating the precipitate slurry to 50-150° C. for at least 10 minutes to form a heated mixture. The method includes separating a precipitate from the heated mixture to obtain a powder. The method includes calcining the powder at a temperature of 100 to 600° C. to obtain the NiO/Fe$_2$VO$_4$ nanoparticles.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
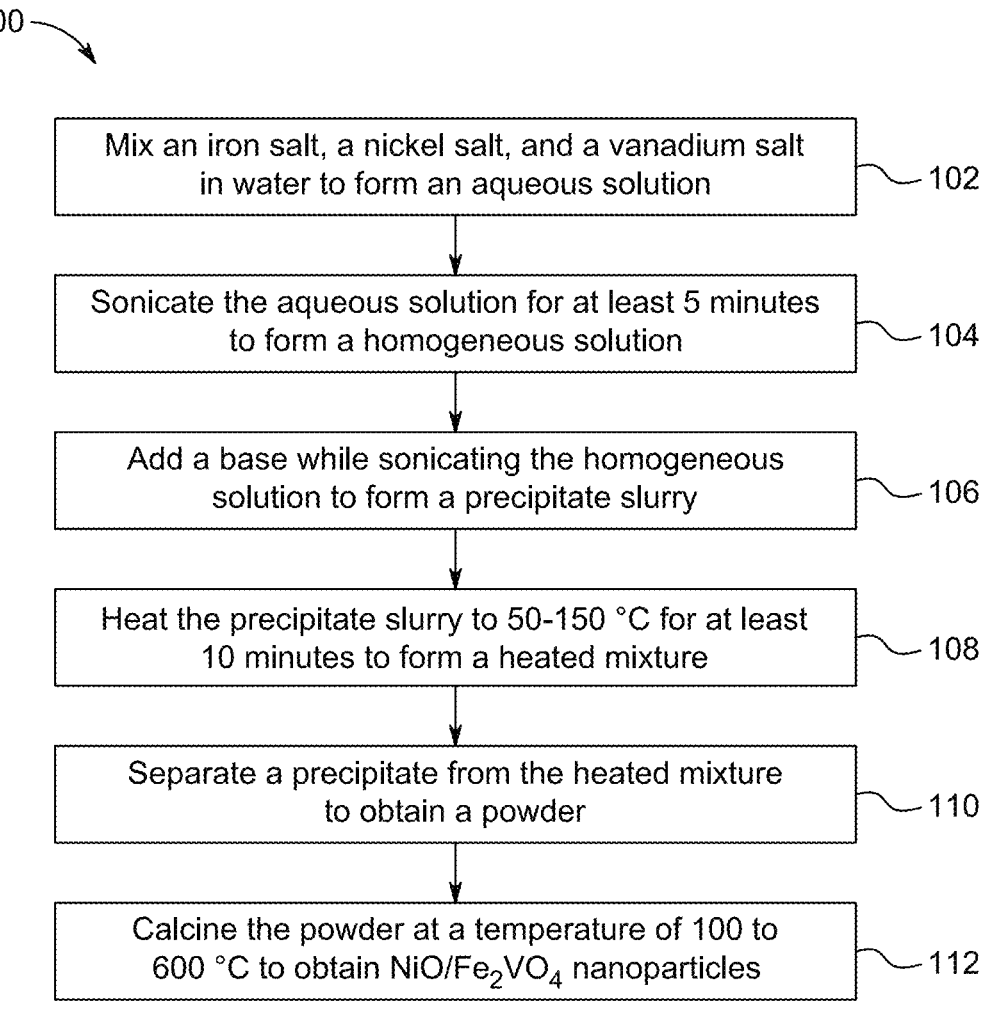
FIG. 1 is a schematic flow chart of a method of making NiO/Fe$_2$VO$_4$ nanoparticles, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

All ranges disclosed herein are inclusive of the endpoints, and the endpoints are independently combinable with each other, and inclusive of all intermediate values of the ranges. Thus, ranges articulated within this disclosure, e.g. numerics/values, shall include disclosure for possession purposes and claim purposes of the individual points within the range, sub-ranges, and combinations thereof.

Aspects of the present invention are directed toward a nanocomposite electrode, particularly towards developing NiO/Fe$_2$VO$_4$ (VFN) nanoparticles in an electrode and a corresponding supercapacitor for energy storage.

In an aspect of the present disclosure, a nanocomposite electrode (also referred to as the electrode) is provided. The nanocomposite electrode includes a substrate, including a first surface and a second surface. The first and second surfaces of the substrate may be made up of the same or different material. In some embodiments, the substrate is made from at least one material selected from the group consisting of stainless steel, aluminum, nickel, copper, platinum, zinc, tungsten, and titanium. In certain other embodiments, the substrate may be iron, brass, silver, and platinum. In a preferred embodiment, the substrate is aluminum. In an embodiment, the substrate may be a mesh, a foil, or a thicker substrate with no holes. In an embodiment, the substrate is aluminum mesh. The substrate may have a thickness in a range of about 10 micrometers (μm) to 140 μm, for example, ranging from about 20 μm to about 120 μm, from about 50 μm to about 100 μm, from about 70 μm to about 95 μm, or from about 85 μm to about 90 μm, including all ranges and sub-ranges therebetween.

The nanocomposite electrode includes a binding compound. As used herein, the term 'binding compound' acts to bind an active layer to the substrate. The binding compound is at least one selected from the group consisting of polyvinylidene fluoride (PVDF) and N-methyl pyrrolidone (NMP). The binding compound may include, but are not limited to, manganese dioxide (MnO$_2$), nickel hydroxide [Ni(OH)$_2$], hydrogen storage alloy, lithium cobalt dioxide (LiCoO$_2$), lithium nickel dioxide (LiNiO$_2$), lithium manganese dioxide (LiMnO$_2$), carbon, graphite, an ethylene propylene diene monomer (EPDM), polytetrafluoroethylene (PTFE), Nafion, epoxy resin, polyvinylidene fluoride-hexafluoropropylene (PVDF-HEP), ZrO$_2$, and TiO$_2$. In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is selected from the group consisting of a fluorine containing polymer including polyvinylidene fluoride and N-methyl pyrrolidone (NMP). In a preferred embodiment, the binding compound is PVDF.

The nanocomposite electrode further includes a conductive additive. As used herein, the term 'conductive additive' is carbon-based and forms a percolating network for electron transport in an electrode layer which largely improves the electrode conductivity. The conductive additive is at least one selected from the group consisting of graphite, activated carbon (AC), reduced graphene oxide (rGO), carbon nanotubes (CNTs), carbon nanofibers (CNFs), and carbon black. The conductive additive may further include, but are not limited to, carbide-derived carbon (CDC), carbon aerogel, and graphene. The binding compound and the conductive additives in the nanocomposite electrode impart a firm structure and a continuous conduction path.

The nanocomposite electrode further includes NiO/$Fe_2VO_4$ nanoparticles, also referred to as the nanoparticles. In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In one embodiment, the shape is uniform the NiO/$Fe_2VO_4$ nanoparticles have a substantially spherical shape. Such nanoparticles may have a homogeneous distribution of nickel, iron, and vanadium atoms. In an embodiment, the nanoparticles have a molar ratio of iron to nickel to vanadium of 1-10 to 1-10 to 1-10, preferably 1:1:1, 1:5:1, 1:10:1, 5:1:1, 10:1:1, 1:1:5, 1:1:10 including all ranges and subranges therebetween.

The NiO/$Fe_2VO_4$ nanoparticles have an average diameter of 1-20 nanometers (nm), more preferably 5-15 nm, or approximately 10 nm. In some embodiments, the nanoparticles are not aggregated and are monodisperse. In some embodiments, the NiO/$Fe_2VO_4$ nanoparticles are aggregated and have an average aggregate size of 1 to 50 micrometers (μm), more preferably 15 to 45 μm, 20 to 40 μm, 25 to 35 μm, or approximately 30 μm. When the NiO/$Fe_2VO_4$ nanoparticles are aggregated they form an interconnected chain. The interconnected chain of NiO/$Fe_2VO_4$ nanoparticles is at least 1 μm in length, preferably 1 to 50 μm, more preferably 10 to 45 μm, 20 to 40 μm, 25 to 35 μm, or approximately 30 μm. In some embodiments, the NiO/$Fe_2VO_4$ nanoparticles form an interconnected chain while dispersed in a matrix of the conductive additive. For example, when the NiO/$Fe_2VO_4$ nanoparticles are incorporated into a mixture with the conductive additive on the electrode substrate, the interconnected chain of nanoparticles remains intact on the electrode substrate and travels through the conductive additive material. In some embodiments, the NiO/$Fe_2VO_4$ nanoparticles may be replaced by $TiO_2$—$WO_3$, ZnO—NiO, $CeO_2$—$MnO_x$, $Co_3O_4$—ZnO, $TiO_2$—$Fe_2O_3$, Ni—Co—Mn, Ni—Co—Fe, $V_2O_5$—$Ni_3S_2$, and $SnO_2$—$V_2O_5$ particles.

FIG. 1 illustrates a schematic flow chart of a method 100 of making the NiO/$Fe_2VO_4$ nanoparticles. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing an iron salt, a nickel salt, and a vanadium salt in water to form an aqueous solution. The iron salt, the nickel salt, and the vanadium salt are ferrous sulfate heptahydrate ($FeSO_4 \cdot 7H_2O$), nickel chloride hexahydrate ($NiCl_2 \cdot 6H_2O$), vanadium pentaoxide ($V_2O_5$). In an embodiment, the iron salt, the nickel salt, and the vanadium salt may include, but are not limited to, ferrous fumarate, ferrous succinate, ferrous sulfate, ferrous gluconate; potassium nickel selenate dihydrate, rubidium nickel selenate tuttons salt, potassium nickel selenate tuttons salt, vanadium trioxide, sodium metavanadate, vanadium tetrachloride, vanadium oxychloride, ammonium vanadate, and vanadium monosulfide. The molar ratio of the iron salt, the nickel salt, and the vanadium salt is 1-10 to 1-10 to 1-10 preferably 1:1:1, 1:5:1, 1:10:1, 5:1:1, 10:1:1, 1:1:5, 1:1:10 or any range in between. The mixing may be performed manually or with a magnetic stirrer. In some embodiments, the mixing is carried out at room temperature or at a temperature of 30-70° C., preferably 40-60° C., or approximately 50° C. to obtain the aqueous solution.

At step 104, the method 100 includes sonicating the aqueous solution for at least 5 minutes, preferably 5-30 min, 10-20 or approximately 15 min to form a homogeneous solution. As used herein, the term sonication refers to applying sound energy to agitate particles or discontinuous fibers in a liquid.

At step 106, the method 100 includes adding a base while sonicating the homogeneous solution to form a precipitate slurry. A color change may be observed on adding a base into the homogeneous solution to form the precipitate slurry. In some embodiments, the base may include KOH, $Mg(OH)_2$, and $Ca(OH)_2$. In a preferred embodiment, the base is an aqueous NaOH solution.

At step 108, the method 100 includes heating the precipitate slurry to 50-150° C., preferably 75-125° C., or approximately 100° C. for at least 10 minutes, preferably 10-60 minutes, 20-40 minutes, or approximately 30 minutes to form a heated mixture.

At step 110, the method 100 includes separating a precipitate from the heated mixture to obtain a powder. The precipitate can be obtained by centrifugation or filtration. In some embodiments, the precipitate can be obtained using any method known in the prior art.

At step 112, the method 100 includes calcining the powder at a temperature of 100 to 600° C., preferably 200 to 500° C., or 300 to 400° C. to obtain the NiO/$Fe_2VO_4$ nanoparticles.

A mixture of the binding compound, the conductive additive, and the NiO/$Fe_2VO_4$ nanoparticles, is at least partially coated on the first surface of the substrate to form the nanocomposite electrode. The nanocomposite electrode can be made by any method known in the art. In an embodiment, the nanocomposite electrode is made by mixing binding compound, the conductive additive, and the NiO/$Fe_2VO_4$ nanoparticles to form a mixture. In some embodiments, the mixture is stirred at a temperature of 60-100° C., preferably 70-90° C., or approximately 80° C. to form a homogeneous slurry. In some embodiments, the slurry is cast onto the substrate by any method known in the art including, drop casting, spin coating, doctor blading or using an automatic coating instrument. After casting of the slurry, it is dried at a temperature of 60-100° C., preferably 70-90° C., or approximately 80° C., and cut to size by any method known in the art including, scissors, or a pneumatic disk cutter. In an embodiment, a pneumatic disc cutter is used to cut the electrodes into a desired shape and size. In an embodiment, the electrode may be but is not limited to circular, square, rectangular, or triangular. In an embodiment, a side of the electrodes has a length of 0.1 to 20 mm, preferably 1-15 mm, 2-8 mm, 3-7 mm, 4-6 mm, or approximately 5 mm. In an embodiment, the length of each side of the electrode is the same. In an embodiment, the length of each side of the electrode are not the same. In an embodiment, the coating is less than 10 μm, preferably 0.1-10 μm, 0.5-5 μm, or 1-2 μm thick. In an embodiment, at least 10%, preferably 20%, 30%, 40%, 50%, 60%, 70%, 80%, 90%, or 100% of a first surface of the substrate is coated with the mixture.

The mixture includes of 5-10 wt. % of the binding compound, preferably 7-9 wt. % or approximately 8 wt. %, 70-90 wt. %, more preferably 75-85 wt. % or approximately 80 wt. % of the conductive additive, and 1-20 wt. %, more preferably, 5-15 wt. %, or approximately 10 wt. % of the $NiO/Fe_2VO_4$ nanoparticles, based on the total weight of the mixture. The mixture includes 70-90 wt. % C, preferably 75-85 wt. % or approximately 80 wt. %, 0.5-5 wt. % V, preferably 1-4 wt. %, or 2-3 wt. %, 1-10 wt. % Fe, preferably 2-8 wt. %, or 4-6 wt. %, and 1-10 wt. % Ni, preferably 2-8 wt. %, or 4-6 wt. % based on the total weight of the mixture. In some embodiments, the elements V, C, Fe, and Ni are homogeneously distributed on the first surface of the substrate.

In some embodiments, after coating with the mixture, the first surface of the substrate is hydrophilic. In some embodiments, the second surface may or may not be hydrophilic. In general, a surface is said to be hydrophilic when its static water contact angle $\theta$ is <90° and is hydrophobic when $\theta$ is >90°. As used herein, the term 'water angle' refers to the angle formed between a surface of a droplet of water and the surface on which the droplet is resting. As the first surface of the substrate has a water contact angle of less than 37°, preferably less than 35°, or 30° hence, the first surface of the substrate is hydrophilic in nature.

Another aspect of the present disclosure provides a supercapacitor device. The supercapacitor device includes two symmetrically facing nanocomposite electrodes. In an embodiment, the supercapacitor device comprises the electrode (or first electrode) and a second electrode. In an embodiment, the second electrode may or may not be similar to the first electrode. The second electrode may include a substrate, one or more binding compounds, and conductive additives. In an embodiment, a second mixture of the binding compound and the conductive additive may partially be coated on a first surface of the second substrate. In an alternate embodiment, the second mixture may be completely coated on the first surface of the second substrate. The first and second mixture are collectively referred to as 'the mixtures' or individually referred to as 'the mixture', unless otherwise specified. The first surface of the first electrode and the first surface of the second electrode is coated with the mixtures and positioned facing one another or the first surfaces with the mixture face inwards. In a preferred embodiment, the first and second electrodes have the same components and form a supercapacitor with a symmetric configuration.

The supercapacitor device further includes an electrolyte which is disposed between and is in contact with the first surfaces. In some embodiments, the electrolyte is an aqueous solution of an alkali metal hydroxide, an alkaline earth hydroxide, an alkali metal salt, or an alkaline earth salt. In an embodiment, the aqueous solution has a molarity (M) of 0.1-5 M in the aqueous solution, preferably 0.5-4.5 M, 1-4 M, or 2-3 M. In a preferred embodiment, the electrolyte is a gel electrolyte. In a more preferred embodiment, the gel electrolyte is anhydrous. The electrolyte is a glycerol/KOH gel electrolyte. The gel electrolyte may include one or more of an alkali metal hydroxide, an alkaline earth hydroxide, an alkali metal salt, and an alkaline earth salt. For example, $Na_2SO_4$, NaOH, KOH, and $Mg(OH)_2$ may be used as electrolytes mixed with a polyol compound to form a gel electrolyte. Examples of polyol compounds include, glycerol, propylene glycol, ethylene glycol, and polyethylene glycol.

In an embodiment, the first surface of the first substrate and the first surface of the second substrate may be separated by a separator. In an embodiment, the separator is soaked in the electrolyte and then incorporated into the supercapacitor. In an embodiment, the separator absorbs and holds the gel electrolyte. The separator is a permeable membrane and prevents direct contact between the anode and cathode, thereby preventing short circuits. The separator can be made from any material known in the art including nonwoven fibers (cotton, nylon, polyesters, glass), polymer films (polyethylene, polypropylene, poly (tetrafluoroethylene), polyvinyl chloride), ceramic and naturally occurring substances (rubber, asbestos, wood). Inn an embodiment, the separator is selected from the group consisting of a glass fiber separator, a polyethylene separator, a polypropylene separator and a polyester fiber separator.

In some embodiments, the supercapacitor device has a specific capacitance of 250-300 Farad per gram (F/g), preferably 260-290 F/g, or 270-280 F/g at a current density of 1-5 ampere per gram (A/g). In some embodiments, a wearable device may include the supercapacitor device. In some embodiments, the electrode may be woven into a textile cloth as the power supply for wearable devices. The wearable device may include, but is not limited to, a smart ring, a smart watch, a smart wristband such as a fitness tracker, augmented reality (AR) headsets, and reality (MR) headsets. The supercapacitor device may be electrically connected to a sensor, and function as a battery. A battery includes 2-10 of the supercapacitor devices connected in parallel and/or series.

EXAMPLES

The following examples describe and demonstrate exemplary embodiments of the nanocomposite electrode described herein. The examples are provided solely for the purpose of illustration and are not to be construed as limitations of the present disclosure, as many variations thereof are possible without departing from the spirit and scope of the present disclosure.

Example 1: Materials

Ferrous sulfate heptahydrate ($FeSO_4 \cdot 7H_2O$), nickel chloride hexahydrate ($NiCl_2 \cdot 6H_2O$), Vanadium pentaoxide ($V_2O_5$), sodium hydroxide (NaOH), ammonium molybdate tetrahydrate (($NH_4)_6Mo_7O_{24} \cdot 4H_2O$), potassium hydroxide (KOH) pellets, and glycerol ($C_3H_8O_3$) were obtained from Sigma Aldrich whereas 1-methyl-2-pyrrolidone (NMP) was obtained from Merck. Other chemicals like conductive carbon, conductive additive (Timical super C65), 2-Kuraray active carbon, and PVDF (HSV 900 PVDF) binder were procured from MTI corporations.

Example 2: Electrode and Electrolyte Preparation $FeSO_4 \cdot 7H_2O$, $NiCl_2 \cdot 6H_2O$, and $V_2O_5$ were used to form a metal-based nano-hybrid (VFN) to fabricate electrodes. A molar precursor (0.01 M) solution with a Fe:Ni:V mole ratio of 1:1:1 was prepared in 100 milliliters (mL) for each metal. Sonication for 10 minutes was provided to obtain a homogenous solution. After that, the three solutions were added to a beaker and magnetically stirred at 50° C. for 30 minutes. 2 grams (g) of NaOH pellets were dissolved in distilled water, followed by stirring for 5 minutes to obtain a 50 mL aqueous NaOH solution.

The clear NaOH solution was then added dropwise to the prepared mixed precursor solution under constant stirring to form a mixture. Gradually, the color of the mixture changed from brownish to a dark green shade leading to an immediate formation of precipitates. The solution was radiated by probe sonication during such processes and precipitation step. Then the temperature was raised to 100° C. under continuous stirring for 30 minutes. The color of the solution changed to dark brown. The solution was then allowed to cool down to room temperature (RT). The precipitates were then obtained by centrifugation and washed three times with distilled water, followed by drying for 2 hours in an oven at 100° C. to form a powder. The powder was then calcined at 200° C. and 500° C. for 2 hours, giving a fine black powder (VFN).

For the preparation of electrodes, the binder, PVDF, was dispersed into a mixture of conductive additive and conductive carbon at 70° C. under constant stirring till the formation of a homogeneous slurry. Different concentrations of nanocomposite (C/VFN) material where x=5, 10, and 15% (w/w) were added to the obtained slurry. Depending on the concentrations of the VEN in the slurry, the obtained specimens were labeled as C/VFN5, C/VFN10, and C/VFN15. The slurry was cast on aluminum mesh current collectors using an automatic coating machine (MRX Shenzhen Automation Equipment). After fabrication, the electrodes were dried in a standard oven at 70° C. and cut with die size (15 millimeters (mm)) using the Hi-Throughput Precision Pneumatic Disk Cutter.

Figure 2:
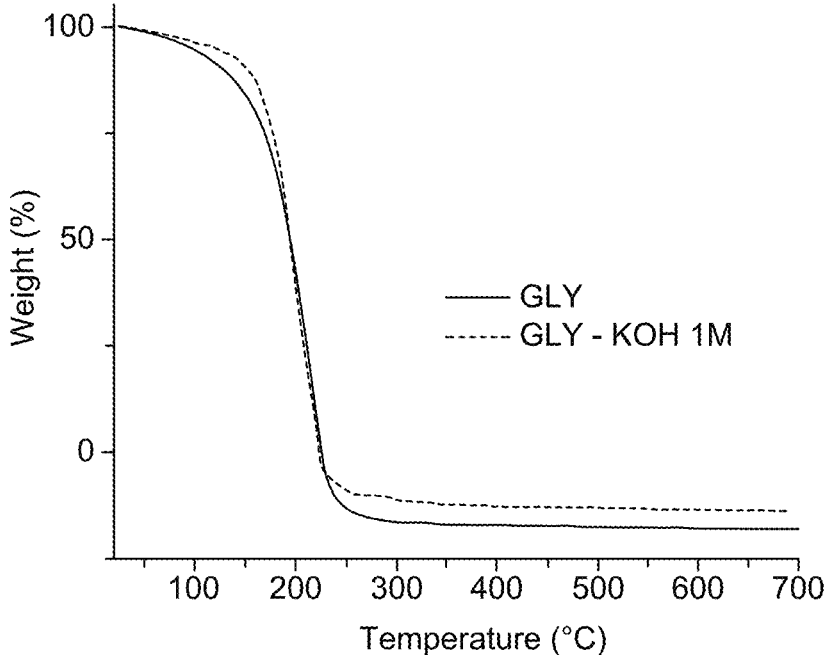
FIG. 2 is a graph depicting thermogravimetry (TG) of pristine glycerol and a gel electrolyte, according to certain embodiments of the present disclosure.

To obtain gel electrolyte (Gly-KOH), calculated quantities of KOH in glycerol were added to 1 M KOH; the sample was stirred at 50° C. until a homogenous mixture was obtained. The mixtures were dried in the oven under vacuum conditions to remove excess moisture. The electrolyte is thermally stable up to at least 150° C., as illustrated by the therapeutic goods administration (TGA) result in FIG. 2.

Example 3: Instrumentation and Experimental Conditions

Raman spectra of the VFN were obtained using Raman Microscope (Model: DXR™ 3, Thermo Scientific) with a laser wavelength $\lambda=455$ nm, 6 milliwatts (mW) power, and 1200 lines/mm diffraction grating. XRD study was performed via Rigaku MiniFlex X-ray diffractometer with Cu K$\alpha$ source operating at 40 kilovolts (kV) and 30 milliamperes (mA). The morphology and structure of the synthesized VFN powder and the distribution of VFN nanoparticles in the electrode were investigated by SEM equipped with energy dispersive spectrometry (EDS). For detailed information, the size, shape, and structure of the VFN complex nanoparticles were analyzed by TEM. Thermogravimetry (TG) measurements were carried out using Perkin Elmer® Pyris 1 TG Analyzer to study the thermal stability by heating the sample under inert atmospheric conditions from ambient temperature to 750° C. at a rate of 10 C/minute. Supercapacitor devices were assembled with the following configuration: Al/C-VFNelectrode/Glycerol-KOH electrolyte/C-VFN electrode/AI.

Electrochemical analysis was conducted on fabricated supercapacitor devices using CV and GCD. CV studies were performed using an electrochemical analyzer (Palmsens Emstat5) at scan rates of 10 to 100 millivolts per second (mV s$^{-1}$), whereas GCD studies were conducted using an MTI® battery analyzer at current densities from 1 to 5 A/g$^1$ with a cut off voltage of 0-0.5 V.

Example 4: Material and Electrode Characterization

Figure 3A:
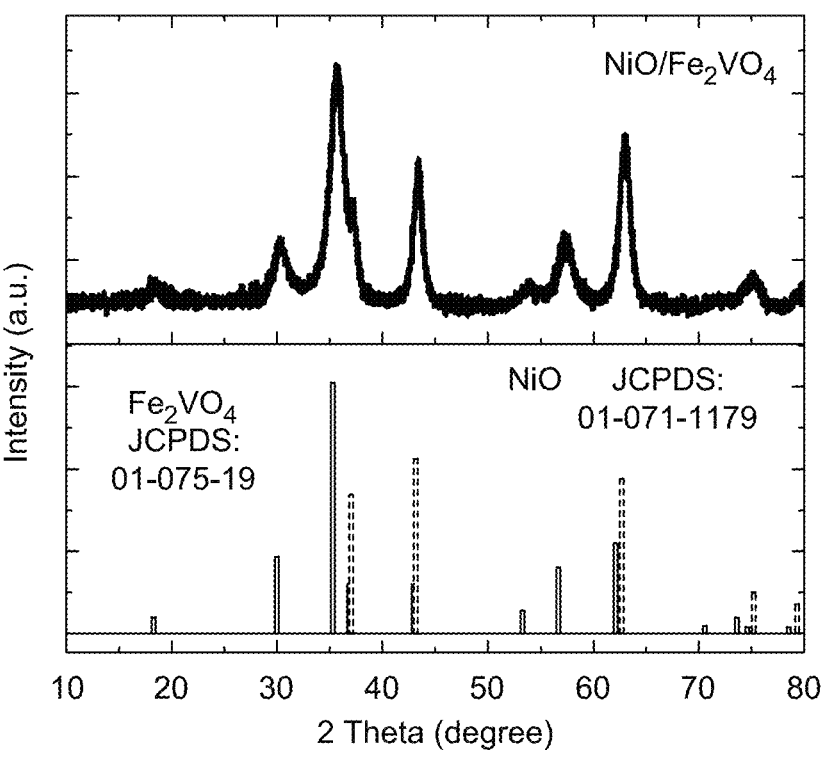
FIG. 3A is an X-ray diffraction (XRD) pattern of the NiO/Fe$_2$VO$_4$ nanoparticles along with standard patterns of NiO and Fe$_2$VO$_4$, according to certain embodiments of the present disclosure.

Phase purity and crystal structure of the VFN complex nanoparticles sample were characterized using XRD. Peaks (FIG. 3A) in the VFN sample show diffraction peaks at 18.24°, 35.50°, 37.22°, 43.28°, 53.84°, 57.49°, 62.95°, and 75.22° correspond to (111), (311), (222), (400), (422), (511), (440), and (622) planes of face-centered cubic (FCC) spinel structure of $Fe_2VO_4$, respectively (FIG. 3A). The lattice constant of the $Fe_2VO_4$ was determined to be a=8.52 angstrom (Å) with a cell volume of 618.47 Å.

However, the relative intensity of the diffraction peaks of 37.22°, 43.28°, and 62.95° are not well-matched with the standard $Fe_2VO_4$ XRD spectra reported in the literature. Such peaks belong to diffraction peaks of NiO, demonstrating overlap between the NiO and $Fe_2VO_4$ peaks and revealing the formation of NiO/$Fe_2VO_4$ nano-hybrid material. The presence of NiO in the sample was also confirmed by EDX, as shown in the microstructure section. The average crystal size (t) of the NiO/$Fe_2VO_4$ was estimated using the Scherrer equation.

$$t=(0.9\lambda)/(\text{FWHM}\cos\theta)$$

The $\lambda$, FWHM, and theta ($\theta$) are the X-ray wavelength, full width at half maximum, and diffraction angle, respectively. The average crystal size of the fabricated material was found to be 9 nm by using the Scherrer equation.

The Raman spectra of the VFN complex nanoparticles sample were taken at RT. The spatial resolution, confocal resolution, and spot size of the laser were 1 μm, 2 μm, and 0.6 μm, respectively. In general, $Fe_2VO_4$ unit cells includes 36 atoms consisting of one $FeO_5$ polyhedron, three $VO_4$ tetrahedra, and two $FeO_6$ octahedra, leading to 54 Raman active optical modes.

Figure 3B:
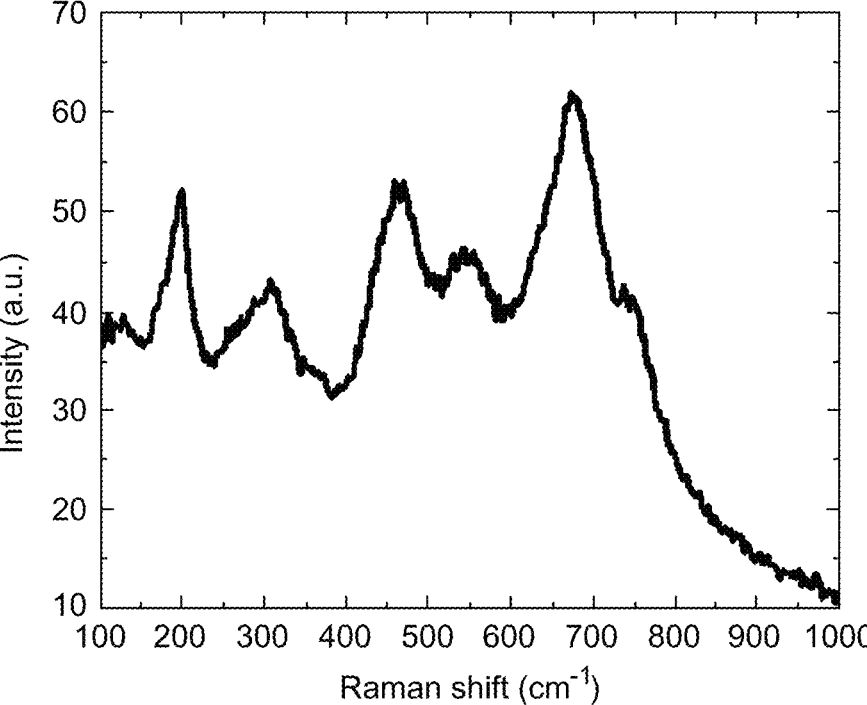
FIG. 3B is a Raman spectrum of the NiO/Fe$_2$VO$_4$ nanoparticles, according to certain embodiments of the present disclosure.

FIG. 3B displays the Raman spectrum of the VFN complex nanoparticles. A Raman peak observed around 200 cm$^{-1}$ is attributed to external vibrations such as rotational modes and crystal lattice translational. Raman peaks at 307 cm$^{-1}$ is attributed to asymmetric vibrations of O—V—O, while peaks observed at 545 cm$^{-1}$ and 677 cm$^{-1}$ is attributed to the active modes T2g and A1g, respectively. Based on a comparison with the literature values of the NiO, two bands observed at 576 cm$^{-1}$ and 720 cm$^{-1}$ correspond to a first-order longitudinal (LO) mode and a transverse (2TO) mode.

Figure 4A:
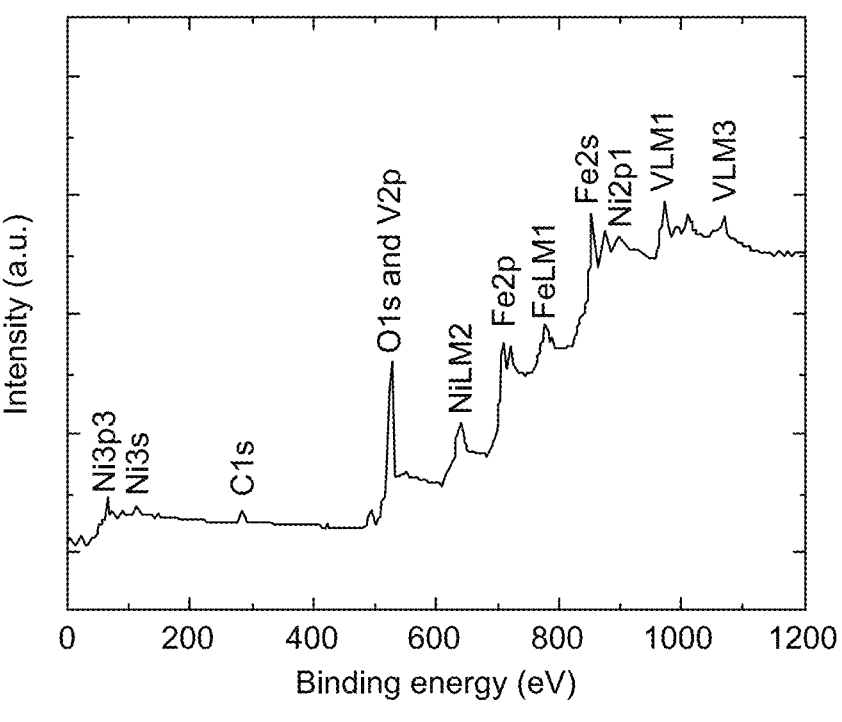
FIG. 4A is an X-ray photoelectron spectroscopy (XPS) survey spectrum of the NiO/Fe$_2$VO$_4$ nanoparticles at high-resolution, according to certain embodiments of the present disclosure.
Figure 4B:
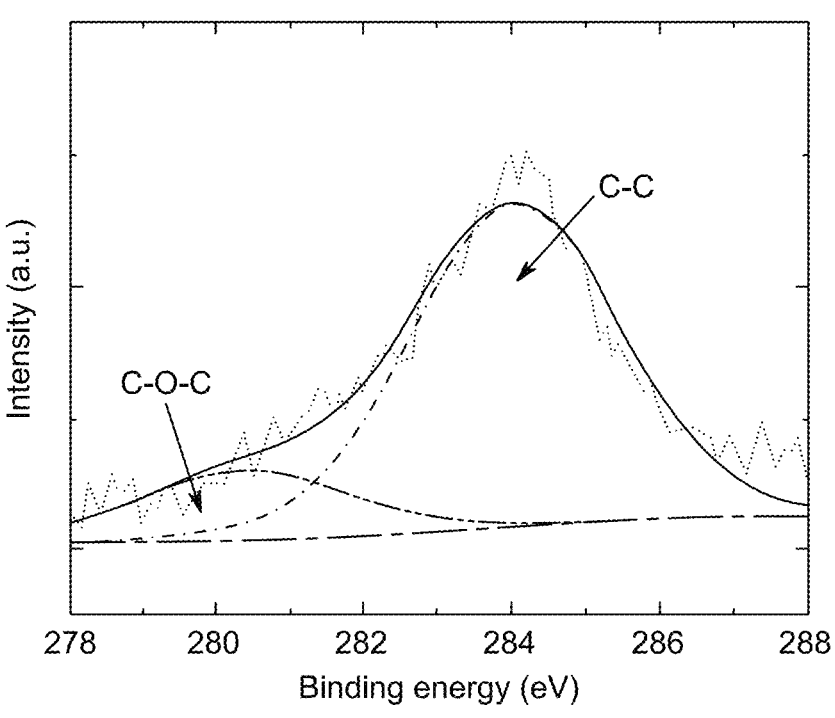
FIG. 4B is an XPS spectrum of C 1s of the NiO/Fe$_2$VO$_4$ nanoparticles, according to certain embodiments of the present disclosure.
Figure 4C:
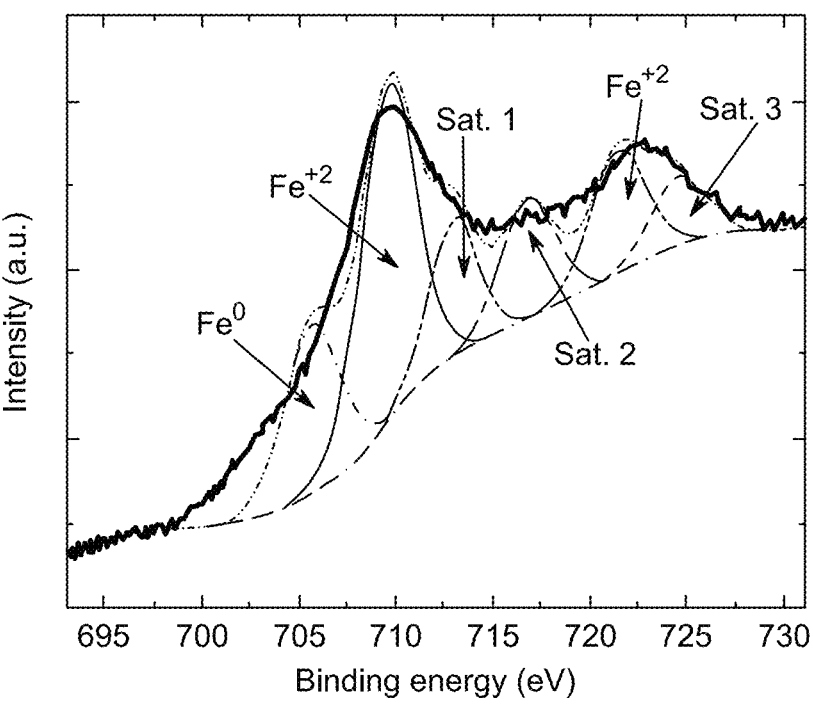
FIG. 4C is an XPS spectrum of Fe 2p of the NiO/Fe$_2$VO$_4$ nanoparticles, according to certain embodiments of the present disclosure.
Figure 4D:
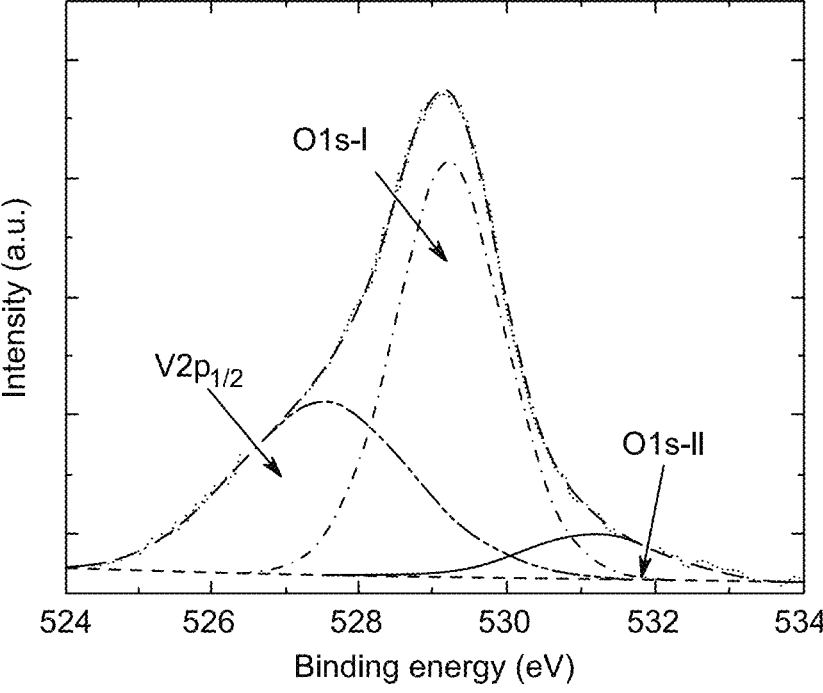
FIG. 4D is an XPS spectrum of O 1s of the NiO/Fe$_2$VO$_4$ nanoparticles, according to certain embodiments of the present disclosure.
Figure 4E:
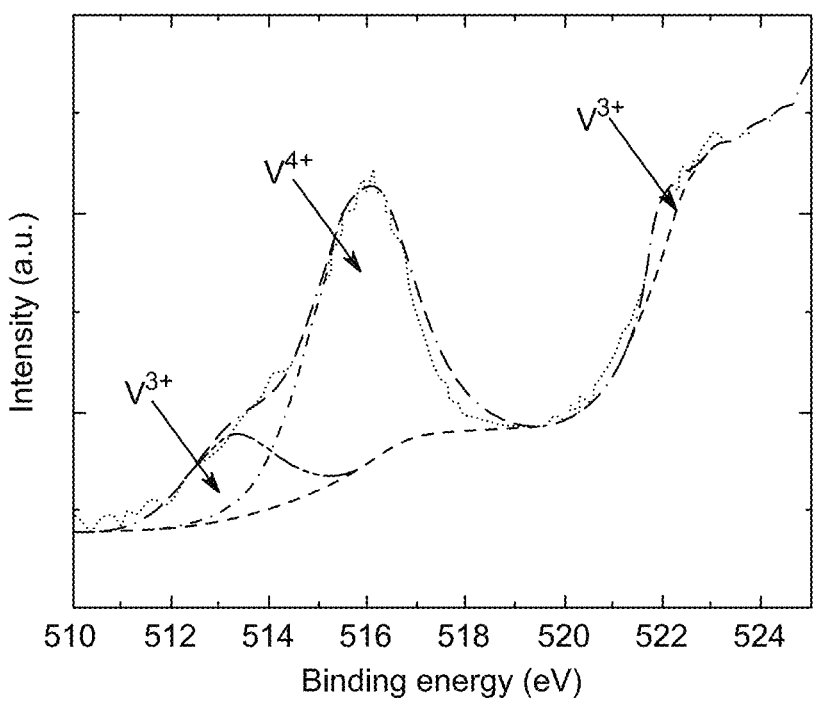
FIG. 4E is an XPS spectrum of V 2p of the NiO/Fe$_2$VO$_4$ nanoparticles, according to certain embodiments of the present disclosure.
Figure 4F:
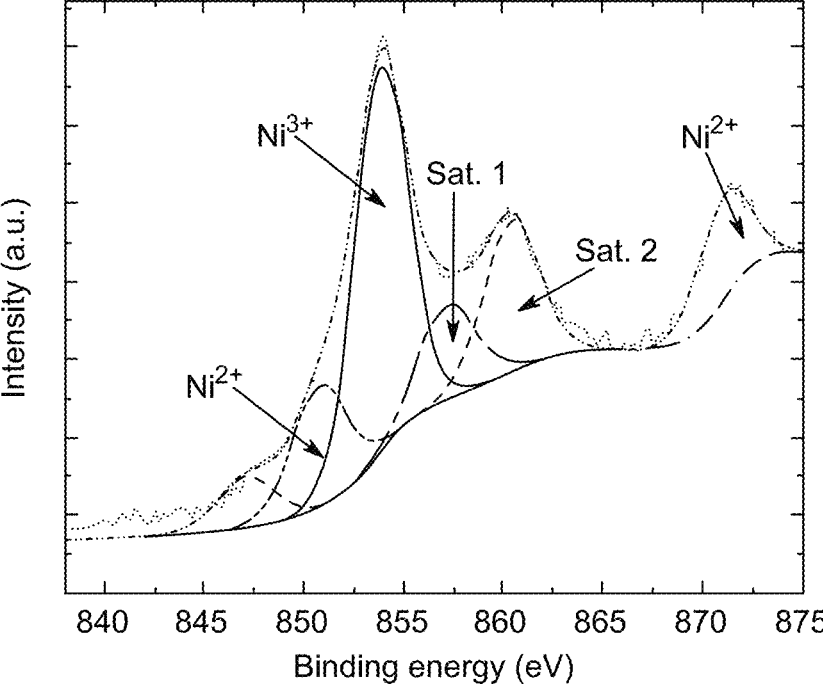
FIG. 4F is an XPS spectrum of Ni 2p of the NiO/Fe$_2$VO$_4$ nanoparticles, according to certain embodiments of the present disclosure.

Surface composition was investigated via XPS. Survey spectra of the VFN sample (FIG. 4A) show the presence of V, O, Fe, Ni, and C elements. C 1s spectrum (FIG. 4B) is deconvoluted into two peaks centered at 284.6 and 280.2 electron volts (eV), which are attributed to C—C, and C—O—C, respectively. Fe 2p spectrum (FIG. 4C) can be fitted into six peaks, which include Fe $2p_{3/2}$ metal at 705.8 eV, Fe(II) $2p_{3/2}$ at 709.9 eV, Fe(II) $2p_{1/2}$ at 721.6 eV, and additional satellite peaks at 713.15, 717.1, and 724.8 eV. O1s core level spectrum was resolved into two individual peaks, as presented in FIG. 4D. A peak centered at 529.2 eV (O 1s-I) is attributed to the metal-O bond in the VFN crystal lattice, while a peak observed at 531.2 eV (O 1s-II) is assigned to chemisorbed oxygen species on the VFN's surface. The third peak centered at 526.4 eV is assigned to V $2p_{1/2}$. A high-resolution spectrum of V2p can be fitted into three peaks at 513.4, 516.0, and 522.2 eV, indicating that oxidation states of vanadium in the VFN sample as (+3 and +4) (FIG. 4E). The Ni 2p spectrum in FIG. 4F shows major Ni $2p_{3/2}$ and Ni $2p_{1/2}$ peaks for $N^0$, $Ni^{2+}$, and $Ni^{3+}$, respectively, along with corresponding satellite peaks.

Figure 5A:
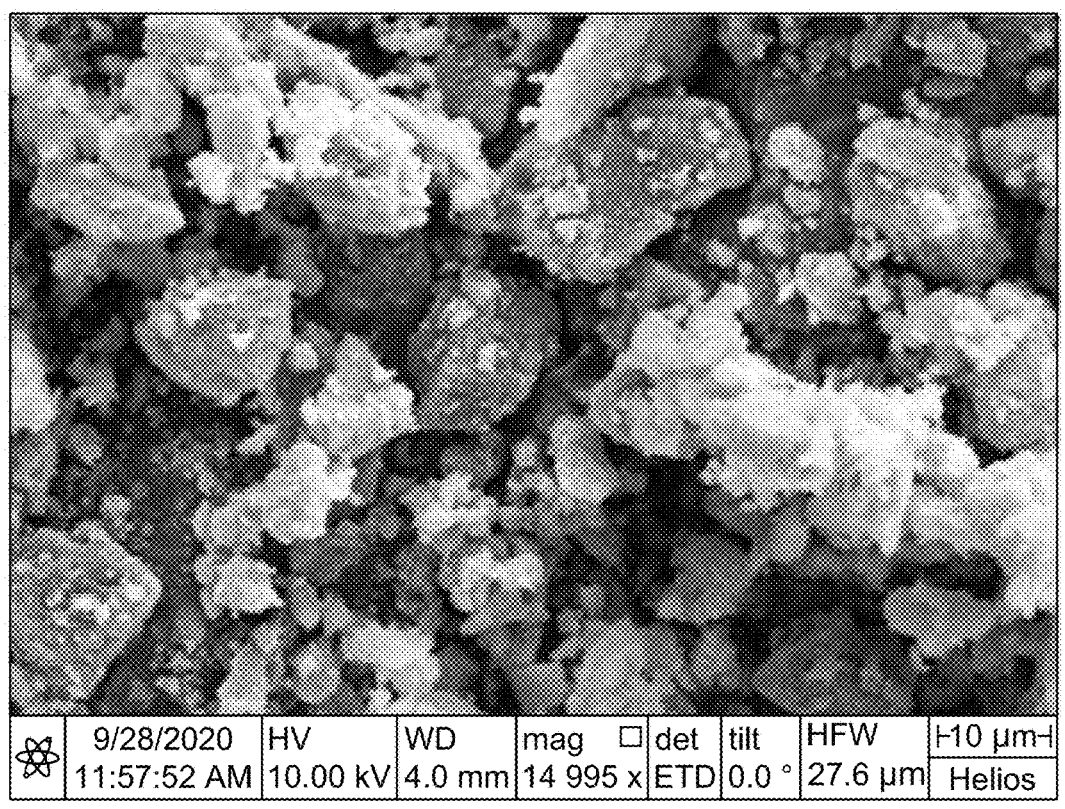
FIG. 5A is a scanning electron microscopy (SEM) micrograph depicting the surface morphology and structure of the NiO/Fe$_2$VO$_4$ nanoparticles, according to certain embodiments of the present disclosure.
Figure 5B:
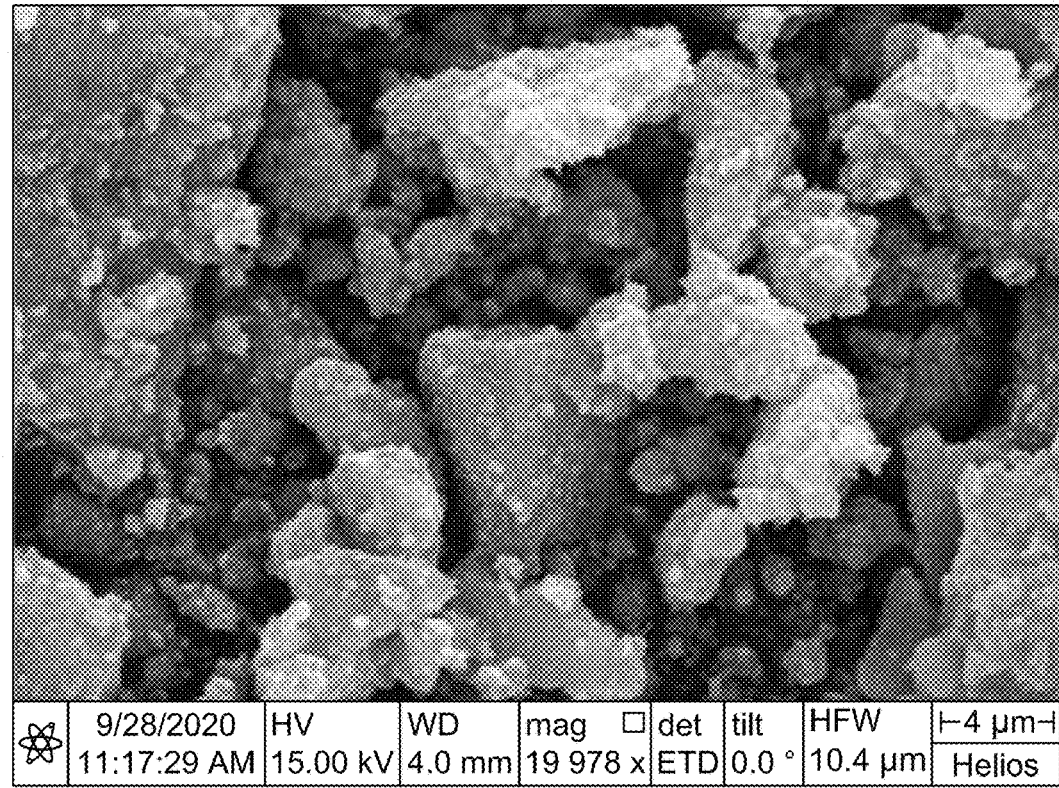
FIG. 5B is a SEM micrograph depicting surface morphology and structure of the NiO/Fe$_2$VO$_4$ nanoparticles, according to certain embodiments of the present disclosure.
Figure 5C:
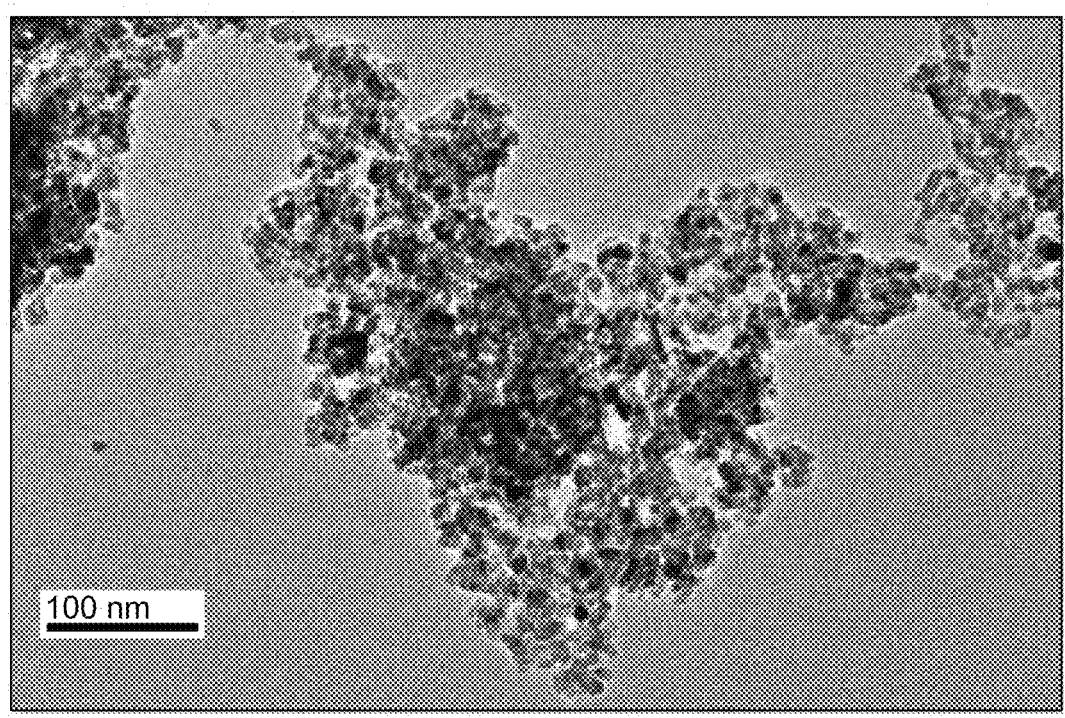
FIG. 5C is a transmission electron microscopy (TEM) image depicting the surface morphology and structure of the NiO/Fe$_2$VO$_4$ nanoparticles, according to certain embodiments of the present disclosure.
Figure 5D:
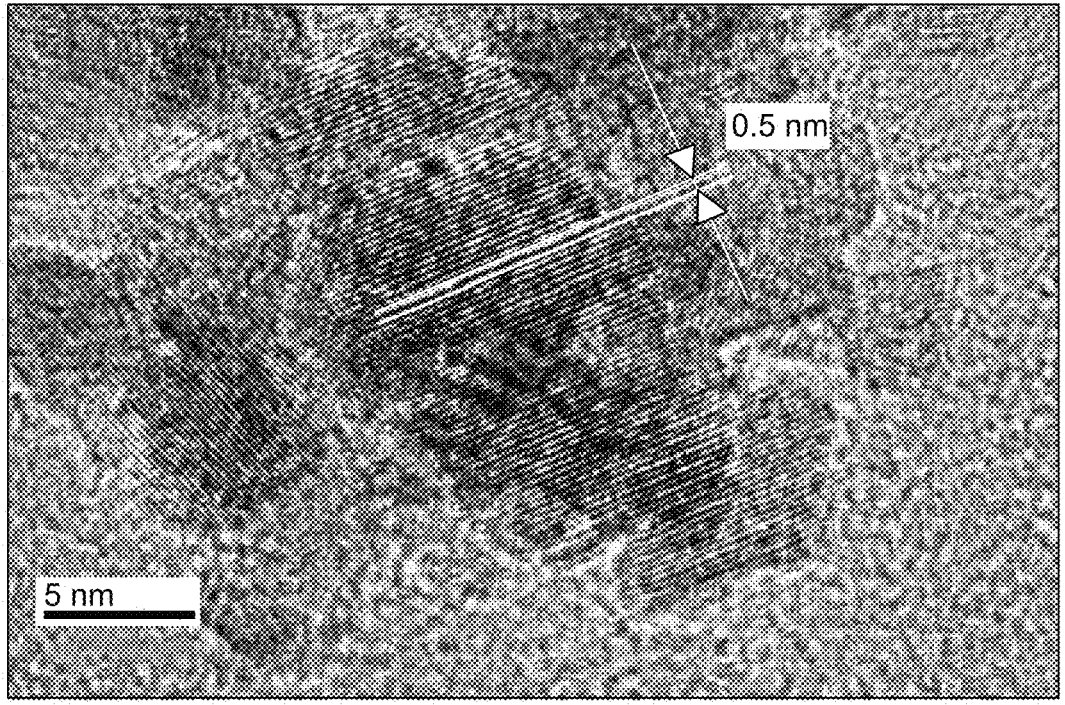
FIG. 5D is a TEM image depicting the surface morphology and structure of the NiO/Fe$_2$VO$_4$ nanoparticles, according to certain embodiments of the present disclosure.

The size, shape, and structure of AC-based carbon electrodes, VFN hybrid nanoparticles, and C/VFN15 electrodes were assessed by SEM and TEM, as shown in FIGS. 5A-5F. SEM micrographs of the VFN powder are illustrated with different magnifications in FIG. 5A and FIG. 5B. FIG. 5C and FIG. 5D shows TEM micrographs of VFN nano-hybrid at a high-resolution scale. The TEM images show aggregated morphology with varied sizes and shapes composed of several individual nanosized particles. The particles have a spherical morphology with a size range between 5-10 nm.

Figure 5E:
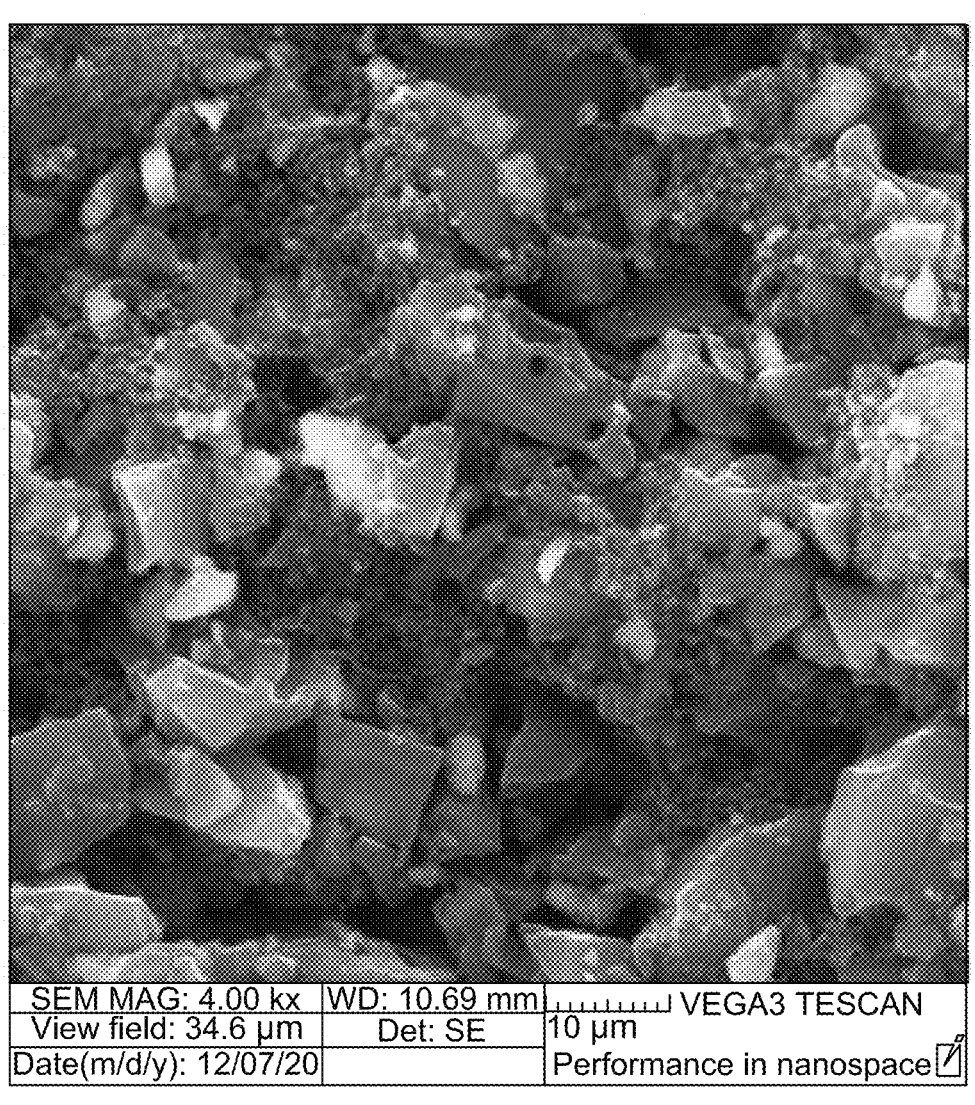
FIG. 5E is a SEM micrograph of a C/VFN15 electrode, according to certain embodiments of the present disclosure.
Figure 5F:
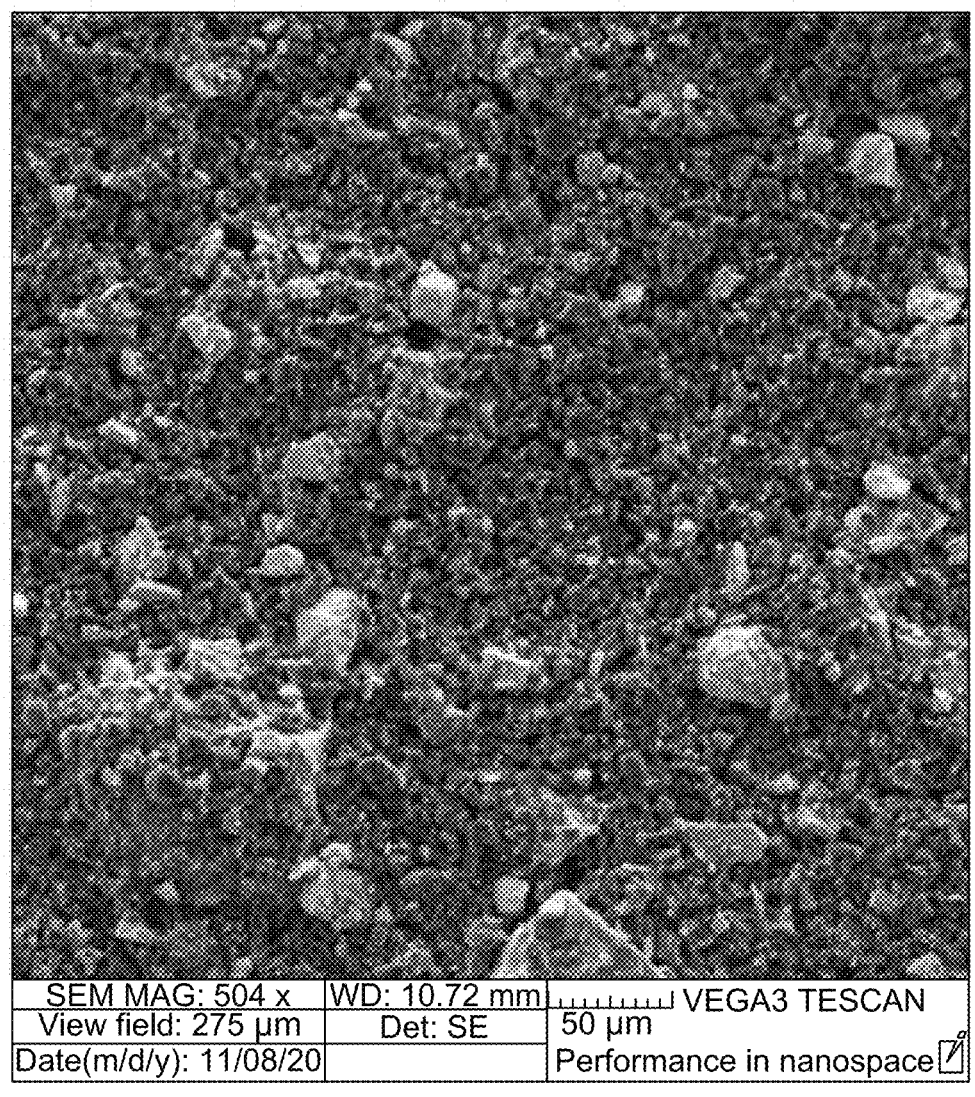
FIG. 5F is a SEM micrograph of the C/VFN15 electrode, according to certain embodiments of the present disclosure.
Figure 6A:
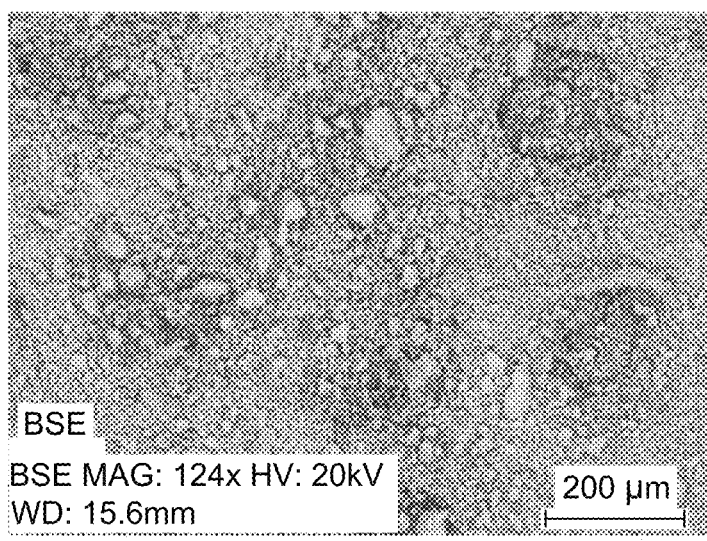
FIG. 6A is a backscattered electrons (BSE) image of the NiO/Fe$_2$VO$_4$ nanoparticles, according to certain embodiments of the present disclosure.
Figure 6B:
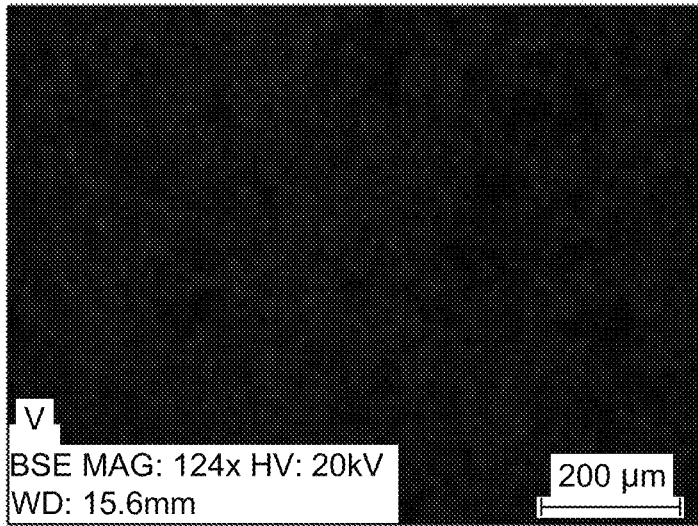
FIG. 6B is an energy dispersive spectrometry (EDS) mapping image of Vanadium (V) for the NiO/Fe$_2$VO$_4$ nanoparticles, according to certain embodiments of the present disclosure.
Figure 6C:
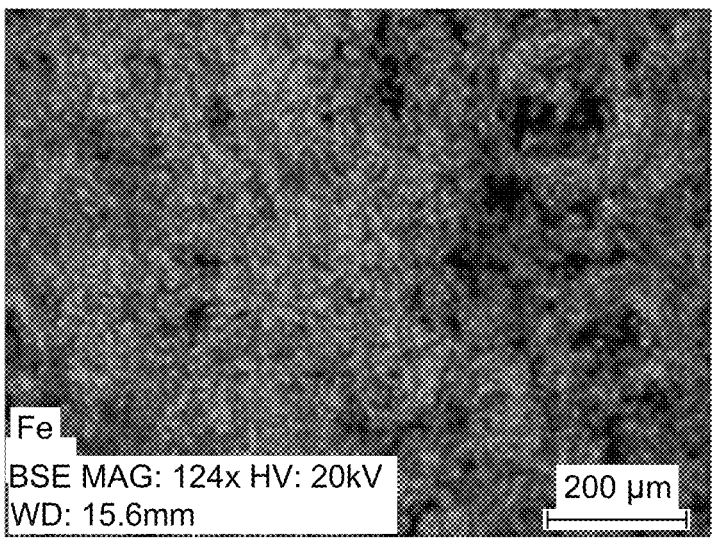
FIG. 6C is an EDS mapping image of iron (Fe) for the NiO/Fe$_2$VO$_4$ nanoparticles, according to certain embodiments of the present disclosure.
Figure 6D:
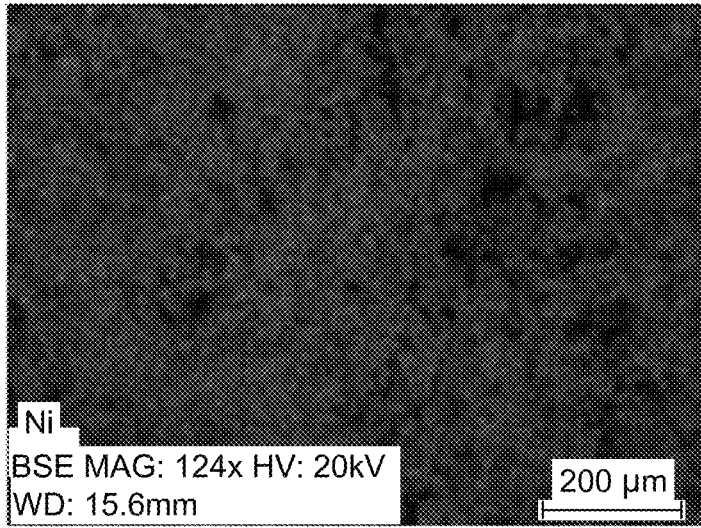
FIG. 6D is an EDS mapping image of nickel (Ni) for the NiO/Fe$_2$VO$_4$ nanoparticles, according to certain embodiments of the present disclosure.

The particles are well connected and improve the electrical conductivity properties of the electrode being constructed using VFN nanoparticles. The small size of the formed nanoparticles warrants a large surface area and might improve electrochemical performance accordingly. SEM illustrates the homogenous dispersion of the as-synthesized d nanoparticles in carbon electrode, C/VFN15, with two magnifications (FIG. 5E and FIG. 5F).

Figures 7A, 7B:
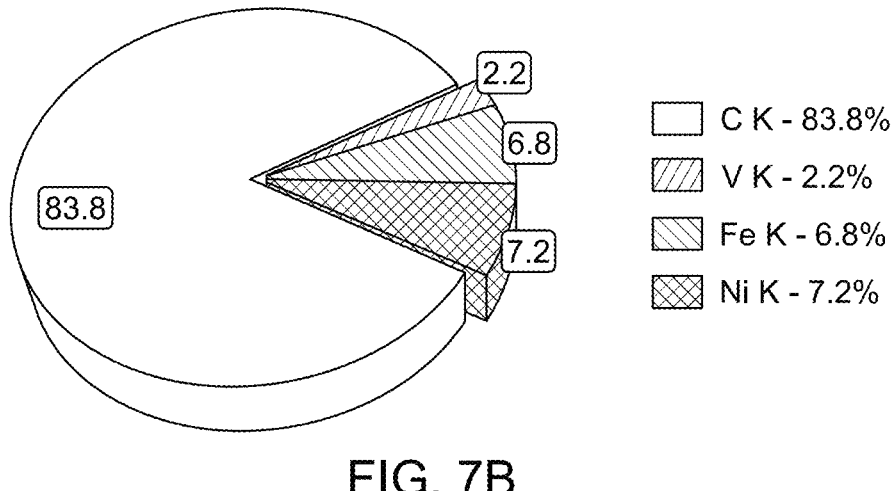
FIG. 7A depicts an SEM image of the C/VFN15 electrode, according to certain embodiments of the present disclosure.
FIG. 7B is an image depicting elemental distribution obtained from EDS mapping of the C/VFN15 electrode in FIG. 7A, according to certain embodiments of the present disclosure.
Figure 7C:
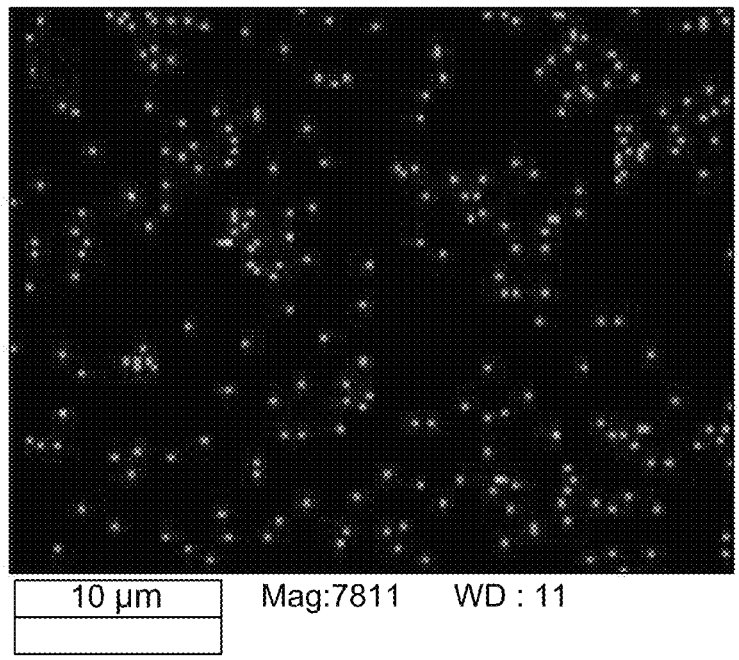
FIG. 7C is an EDS mapping image of V for the C/VFN15 electrode, according to certain embodiments of the present disclosure.
Figure 7D:
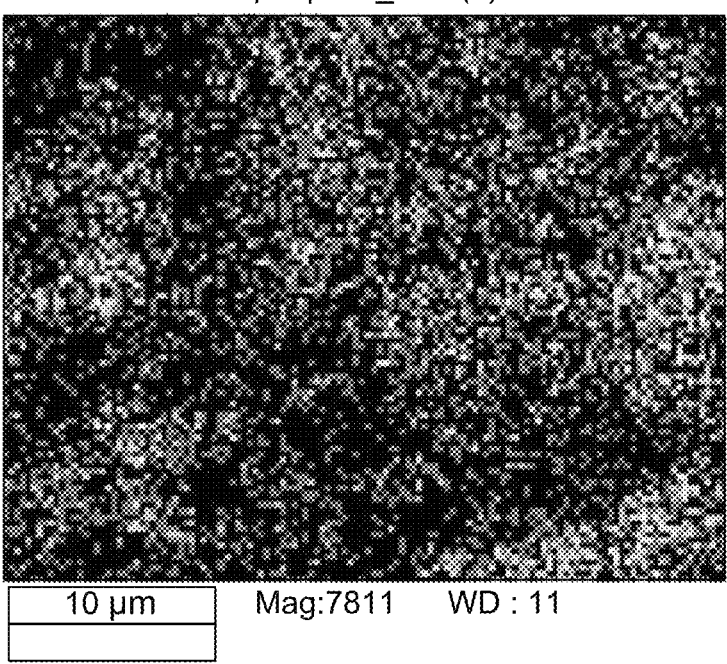
FIG. 7D is an EDS mapping image of Carbon (C) for the C/VFN15 electrode, according to certain embodiments of the present disclosure.
Figure 7E:
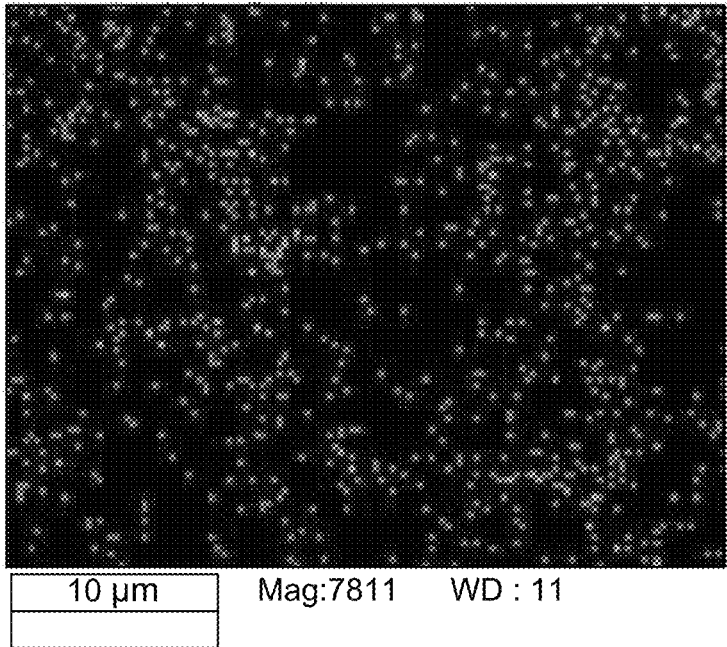
FIG. 7E is an EDS mapping image of Fe for the C/VFN15 electrode, according to certain embodiments of the present disclosure.
Figure 7F:
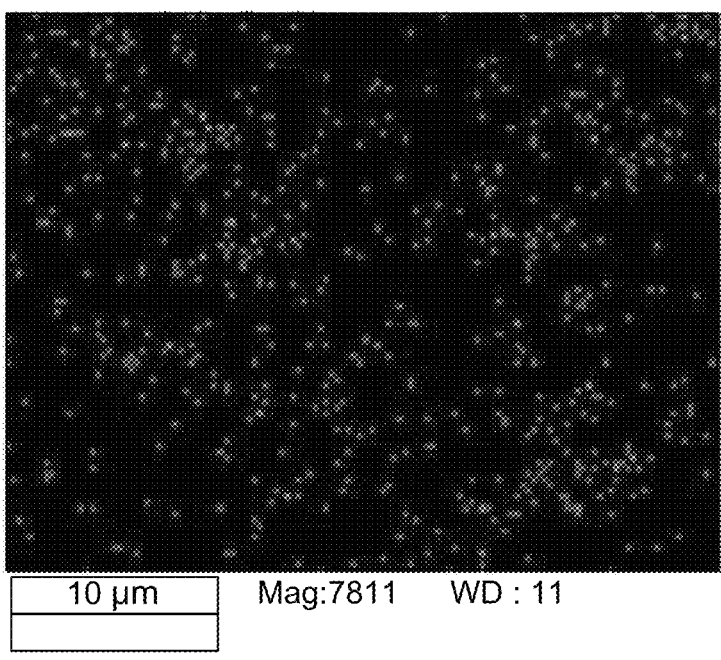
FIG. 7F is an EDS mapping image of Ni for the C/VFN15 electrode, according to certain embodiments of the present disclosure.

EDS spectra of synthesized VFN are shown in FIGS. 6A-6D. FIG. 7A shows a flexible C/VFN15 image with a fine-uniform distribution. The presence of individual components of the composite and electrode, e.g., C, O, Fe, Ni, and V, are shown via EDS. Analyses were conducted to determine the elemental distribution of individual electrode components, as shown in FIG. 7B, for V, C, Fe, and Ni. The weight percentage of the elements is found as C (83.8%), Ni((7.2%), Fe (6.8%), and V (2.2%). The elemental mapping further confirmed the uniform distribution of the electrode components (FIGS. 7C-7F, V, C, Fe, and Ni, respectively). The SEM, EDS, and EDS maps analyses confirmed the successful incorporation of the VFN into the AC-based composite with a homogeneous distribution of all the constituent elements of the electrode.

Figure 8A:
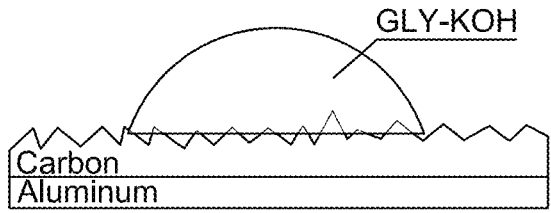
FIG. 8A is a schematic illustration presenting an effect of addition of the NiO/Fe$_2$VO$_4$ nanoparticles on wettability of electrodes, including carbon and aluminum; and carbon and the NiO/Fe$_2$VO$_4$ nanoparticles, according to certain embodiments of the present disclosure.
Figure 8A:
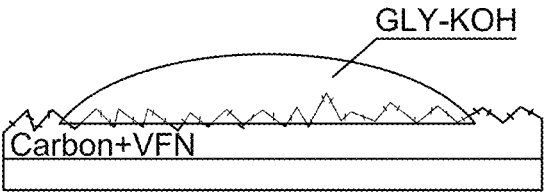
Figure 8B:
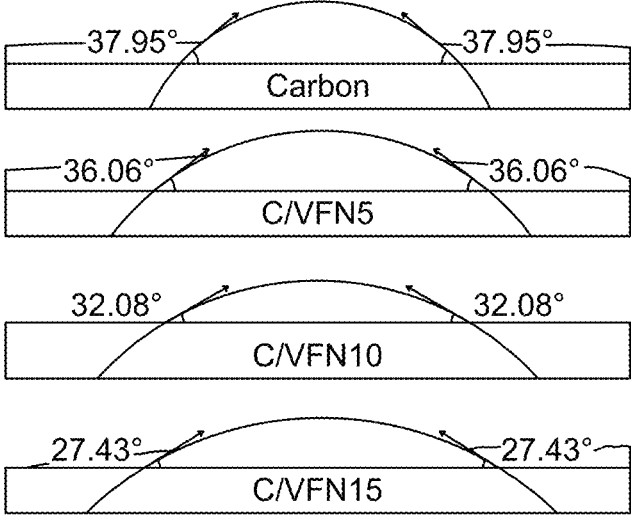
FIG. 8B is an image depicting a contact angle measurement of the electrolyte on various electrodes such as C, C/VFN5, C/VFN10, and the C/VFN15, according to certain embodiments of the present disclosure.

Wettability is another factor other than the conductivity that led to the improvement of the performance of the supercapacitor. Increased wettability contributes to the electrolyte diffusion rate, which increases the electrode-electrolyte interface (FIG. 8A). The electrode surface decreases with the increase in the percentage of the nanocomposite, as the water contact angle decreases from 37.95 degrees in the case of a metal-free electrode (i.e., carbon electrode) to 27.43 degrees with the addition of the metal by a weight ratio of 15% as shown in FIG. 8B. This result indicates an improvement in the interface between the electrolyte and the electrode surface, thus improving the charge transfer and the overall performance of the fabricated supercapacitor with an increase in the rate of doping.

Figure 8C:
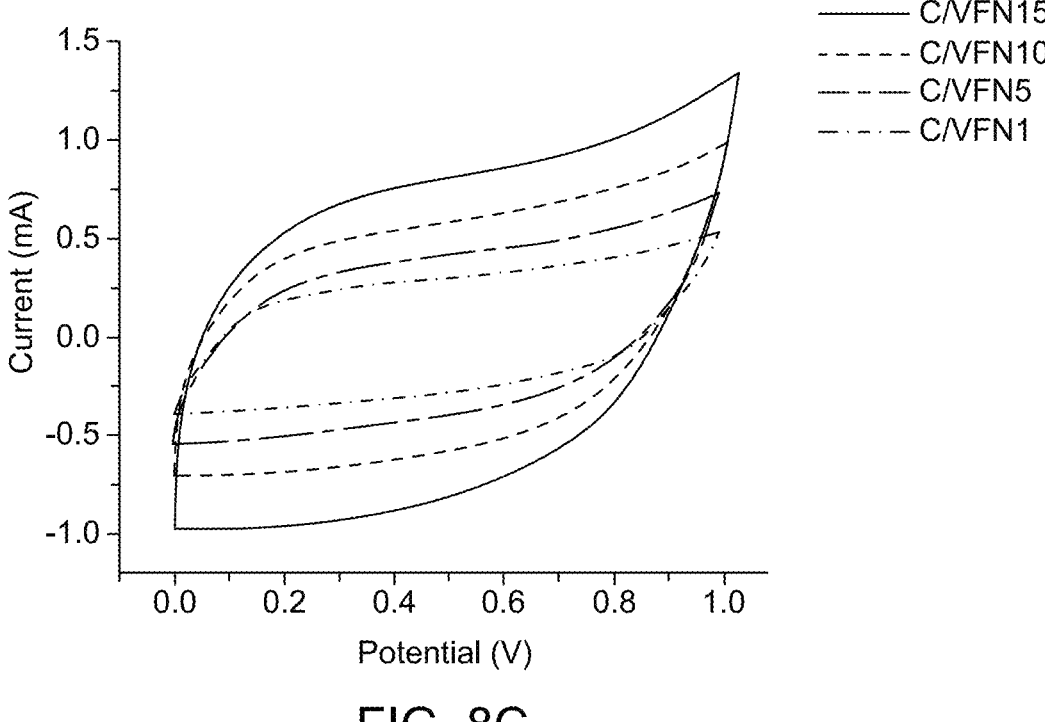
FIG. 8C is a graph depicting cyclic voltammetry (CV) performance of the C/VFN1, C/VFN5, C/VFN10, and the C/VFN15 electrodes with various contents of the NiO/Fe$_2$VO$_4$ nanoparticles at scan rate on 10 millivolts per second (mv s$^{-1}$), according to certain embodiments of the present disclosure.
Figure 8D:
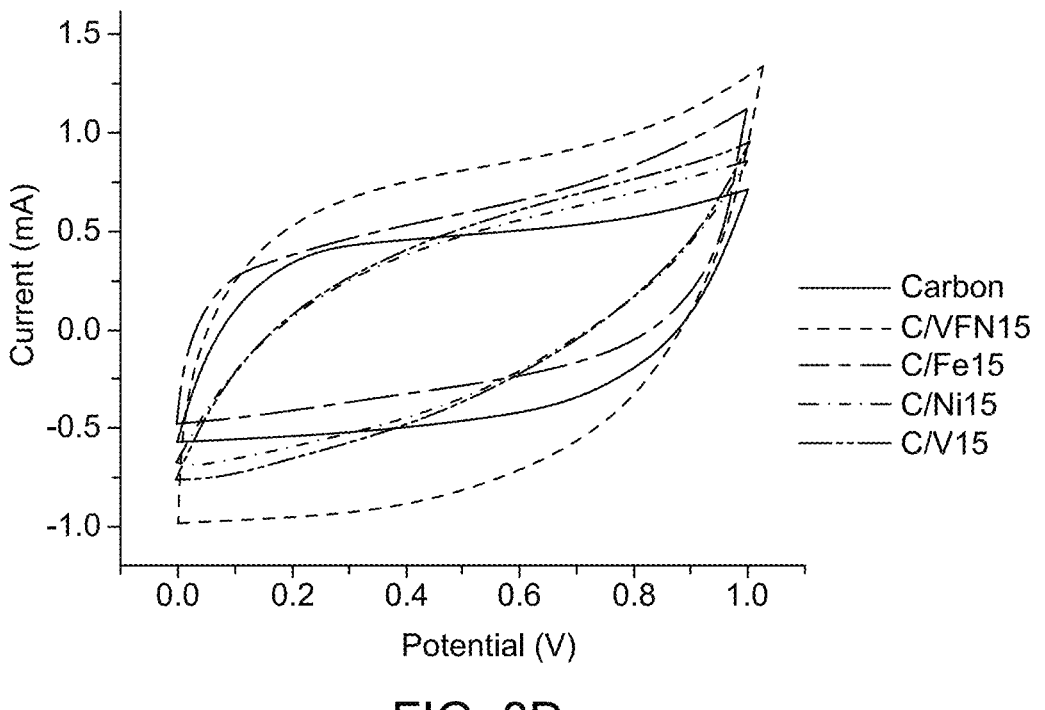
FIG. 8D is a graph depicting a comparative CV of electrodes with C/VFN15, C/Fe$_2$O$_3$, C/NiO and C/VO$_2$, according to certain embodiments of the present disclosure.

EIS and CV curves indicate that the performance of the supercapacitors improved with the increase in the percentage of metal in the electrode's active material. FIG. 8C shows CV curves of the prepared two-electrode cell using the fabricated electrode. The CV area continuously increases with the VFN reaching the corresponding highest value at the weight ratio of 15%. A comparative CV study was performed by the electrodes having the same content of oxides $Fe_2O_3$, NiO, and $VO_2$. FIG. 8D shows comparative CV of electrodes with C/VFN15 including C/$Fe_2O_3$, C/NiO and C/$VO_2$.

Figure 9A:
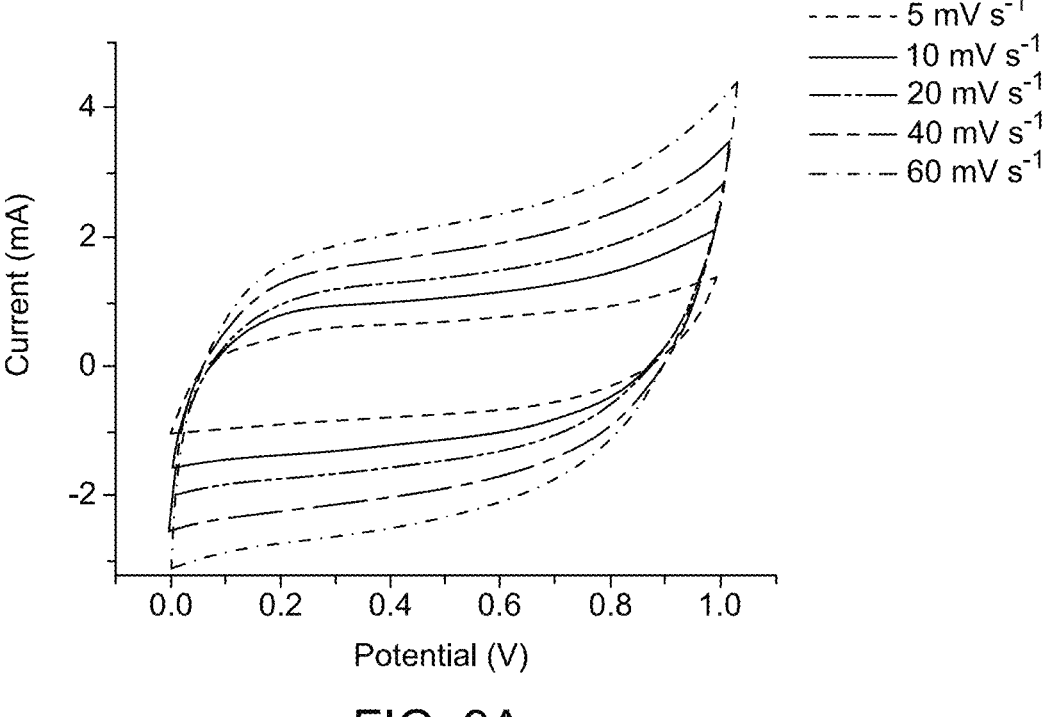
FIG. 9A is a graph depicting CV performance of the C/VFN15 electrode at different scan rates up to 60 mV s$^{-1}$, according to certain embodiments of the present disclosure.
Figure 9B:
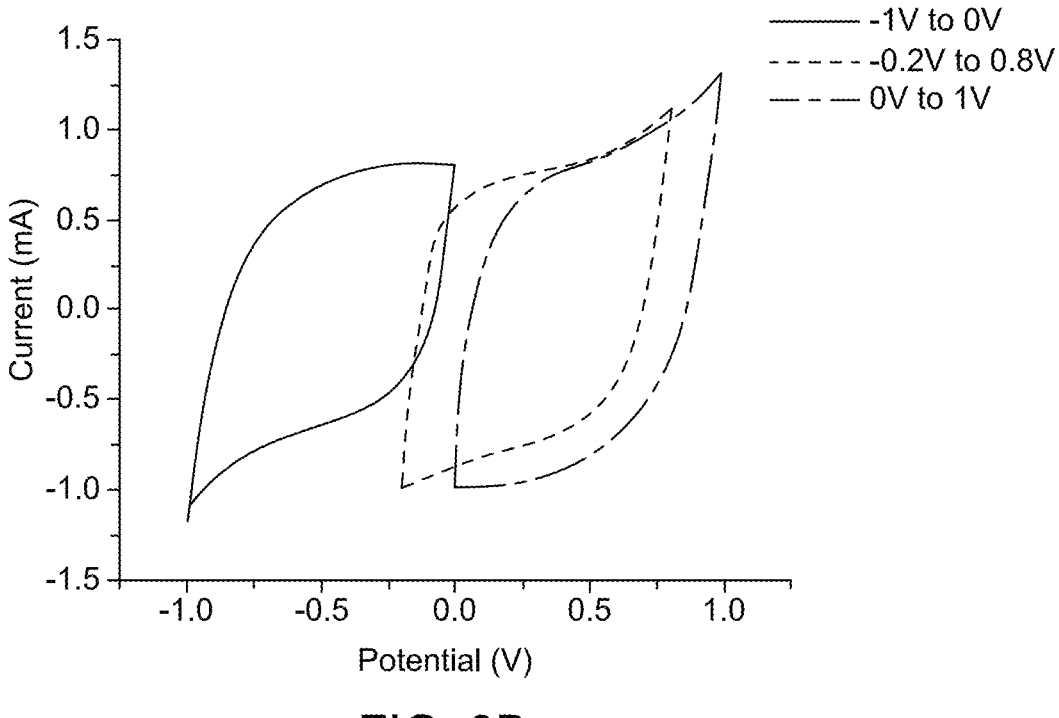
FIG. 9B is a graph depicting CV curves of the C/VFN15 electrode at different potential windows, according to certain embodiments of the present disclosure.
Figure 9C:
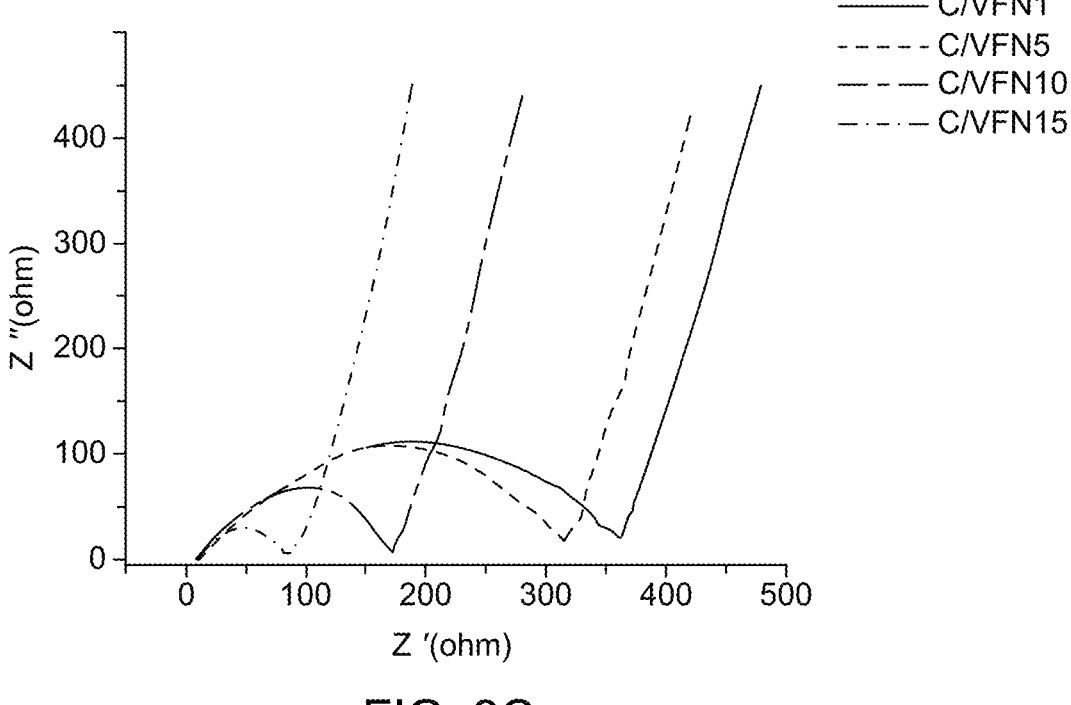
FIG. 9C is a graph depicting Electrochemical Impedance Spectroscopy (EIS) curves of the various electrodes, according to certain embodiments of the present disclosure.

In addition, the fabricated cell using the metal content of C/VFN15 provides sufficient CV profiles even at a high scan rate of up to 60 mV $s^{-1}$, as indicated in FIG. 9A. Furthermore, the fabricated cell demonstrates sufficient CV behavior under different operating potential windows, including −1 to 0 V, −0.2 to 0.8 V, and 0 to 1 V, as presented in FIG. 9B. This outstanding electrochemical performance of the fabricated cell using the electrode of C/VFN15 is attributed to corresponding low series resistance and charge transfer resistance at the electrode/electrolyte interface, as shown in FIG. 9C.

Figure 10A:
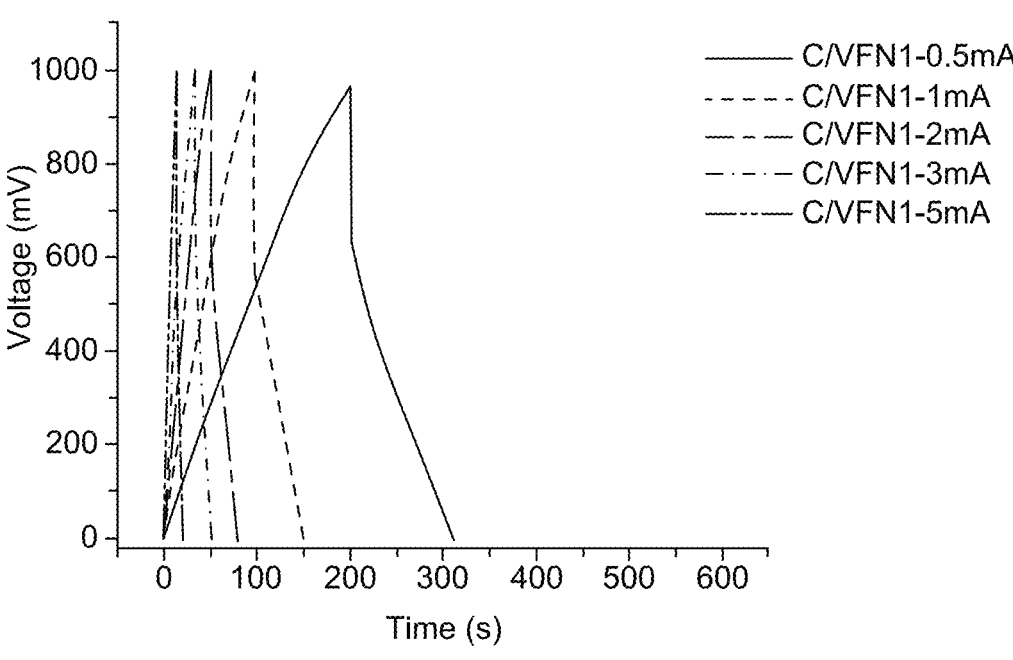
FIG. 10A is a graph depicting galvanostatic charge-discharge (GCD) of the C/VFN1 electrode, at various current densities between 0.5-5 milliamperes (mA), according to certain embodiments of the present disclosure.
Figure 10B:
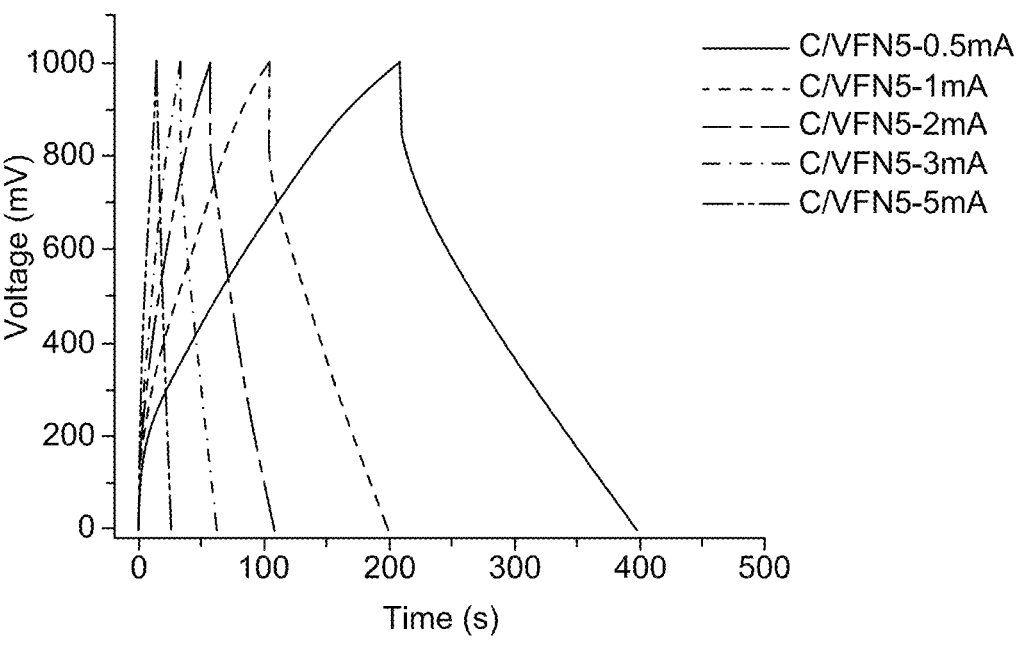
FIG. 10B is a graph depicting GCD of the C/VFN5 electrode at various current densities between 0.5-5 mA, according to certain embodiments of the present disclosure.
Figure 10C:
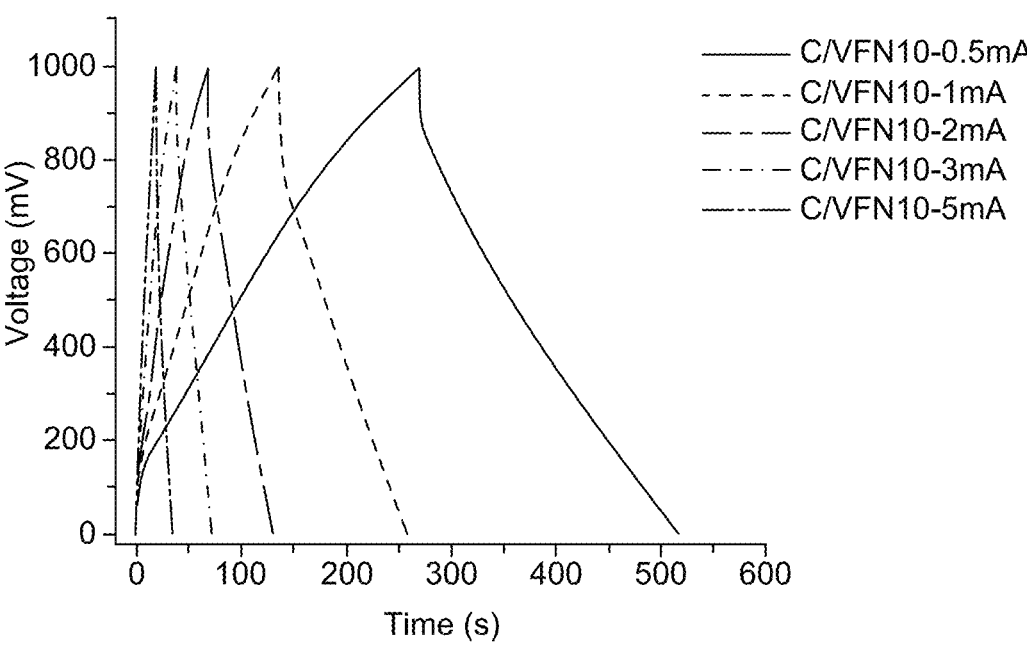
FIG. 10C is a graph depicting GCD of the C/VFN10 electrode at various current densities between 0.5-5 mA, according to certain embodiments of the present disclosure.
Figure 10D:
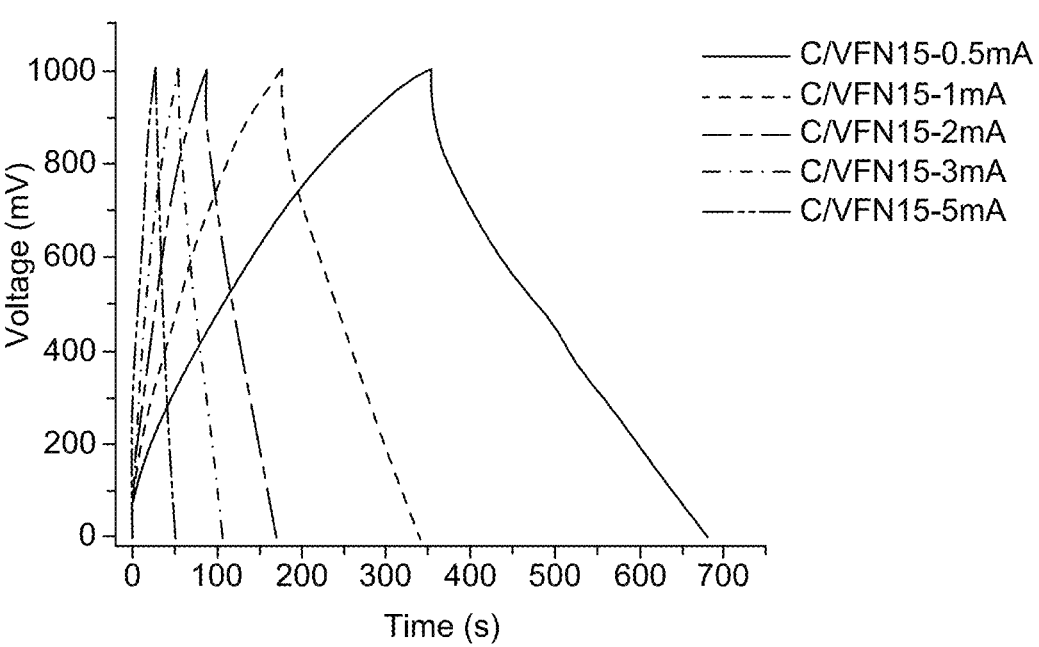
FIG. 10D is a graph depicting GCD of the C/VFN15 electrode at various current densities between 0.5-5 mA, according to certain embodiments of the present disclosure.

Furthermore, GCD profiles provide an increase in the discharging time upon the increase of the VFN at different currents reflecting the enhancement in the overall electrochemical performance of the fabricated electrodes as indicated in FIGS. 10A-10D. FIG. 10A demonstrates GCD profiles of the fabricated electrode with a VFN weight ratio of 1%, which provides discharging time of ~150 s at discharging current of 0.5 mA. The discharging time increased to ~200 s at the same operating condition by adding 5% of the VFN into the fabricated electrode (FIG. 8B). Furthermore, the discharging time increased to ~250 s at 10% (FIG. 8C) and ~350 s at 15% (FIG. 9A). This highlighted the effect of the VFN content on the discharging time of the fabricated device.

Figure 11A:
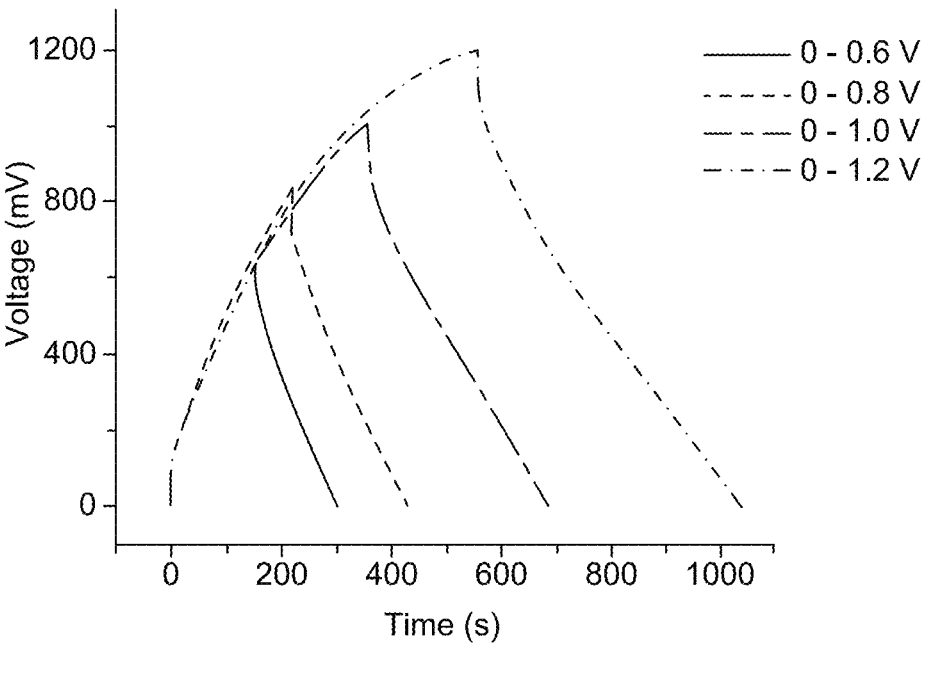
FIG. 11A is a graph depicting GCD curves of C/VFN15 supercapacitor, at different potential windows, and a current density of 1 mA, according to certain embodiments of the present disclosure.
Figure 11B:
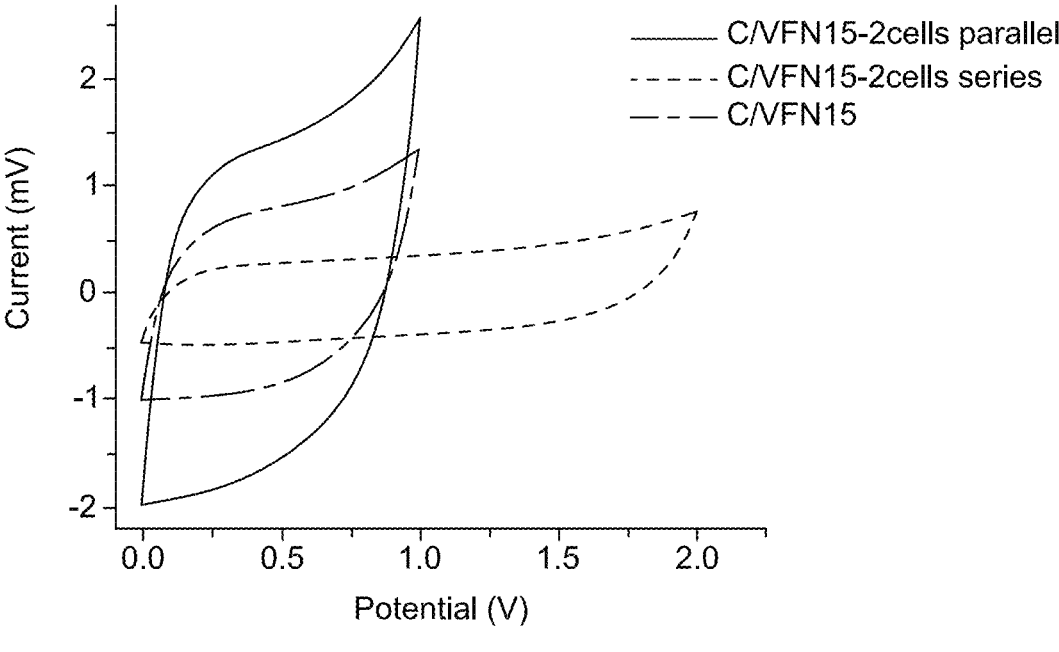
FIG. 11B is a graph depicting CV curves of single and two C/VFN15-based devices in series and parallel connection at a scan rate of 10 mV s$^{-1}$, according to certain embodiments of the present disclosure.
Figure 11C:
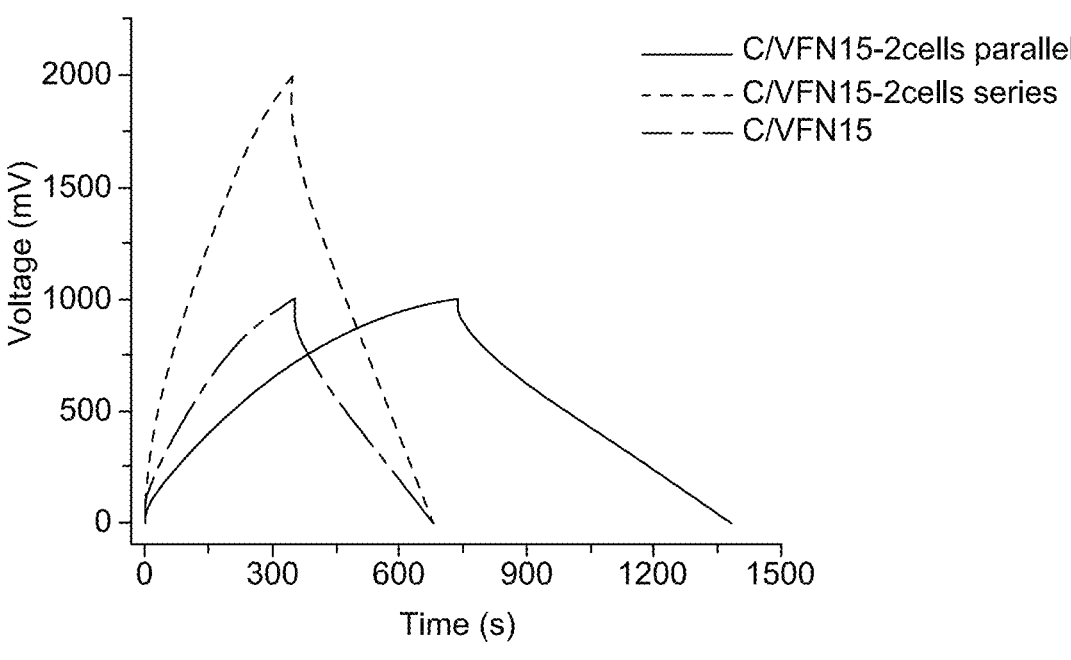
FIG. 11C is a graph depicting GCD curves of the single and two C/VFN15 supercapacitors in series and parallel connection, according to certain embodiments of the present disclosure.

FIG. 11A represents GCD profiles of the C/VFN15 at different potential windows. The potential optimization study showed that the device had a wide voltage window of up to 1.2 V. The curves are consistent, and the C/VFN15 electrode exhibits excellent electrochemical properties and stability. The GCD curves maintained the corresponding quasi-triangular profile in all voltage windows. Furthermore, FIG. 11B shows the CV measurement of C/VFN15 supercapacitors in series and parallel connection. The potential of a series connection linearly increases up to 2 V at 1 mA, which is double that of a single device. While with the parallel connection, a large output current can be obtained, which can satisfy the high current requirement of electrical devices. This was confirmed with GCD measurement, as shown in FIG. 11C, that discharge time in the parallel-connected devices was doubled as compared to the single cell, which was related to the enhancement of the capacitance of the supercapacitors, indicating the improvement in the overall capacitance. The present results show that an in-series connection produces high voltage, while the parallel connection has a longer discharge time related to increased capacitance.

Figure 11D:
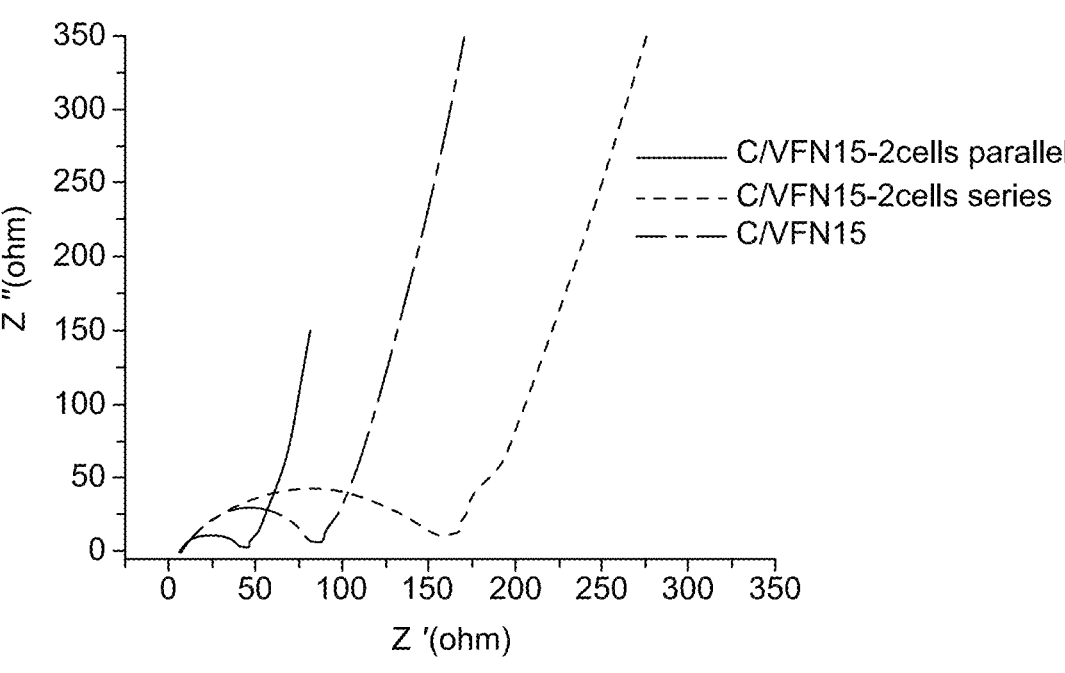
FIG. 11D is a graph depicting EIS curves of the single and two C/VFN15 supercapacitors in series and parallel connection, according to certain embodiments of the present disclosure.

EIS analysis was conducted to compare the charge transfer and ion diffusion behavior in C/VFN15 cells. As estimated from Nyquist plots (FIG. 11D), charge transfer resistance (Rct) at the electro-active and material-current collector interface of the C/VFN15 is 74.1Ω, which increased almost twice when connecting in series (167.5Ω), while decreased noticeably to the half value (37.3Ω) with parallel connection. This connection confirmed the relationship between the capacitance and the assembled devices. However, the electrochemical system's equivalent series resistance (ESR), as measured from the intersection of the curve of the Z' axis at the high-frequency part, was only 8.1Ω. The low ESR value of the devices can be attributed to the high electrical conductivity and the better contact area between the activated carbon layer and the current collector, which greatly serves practical applications.

Figure 12A:
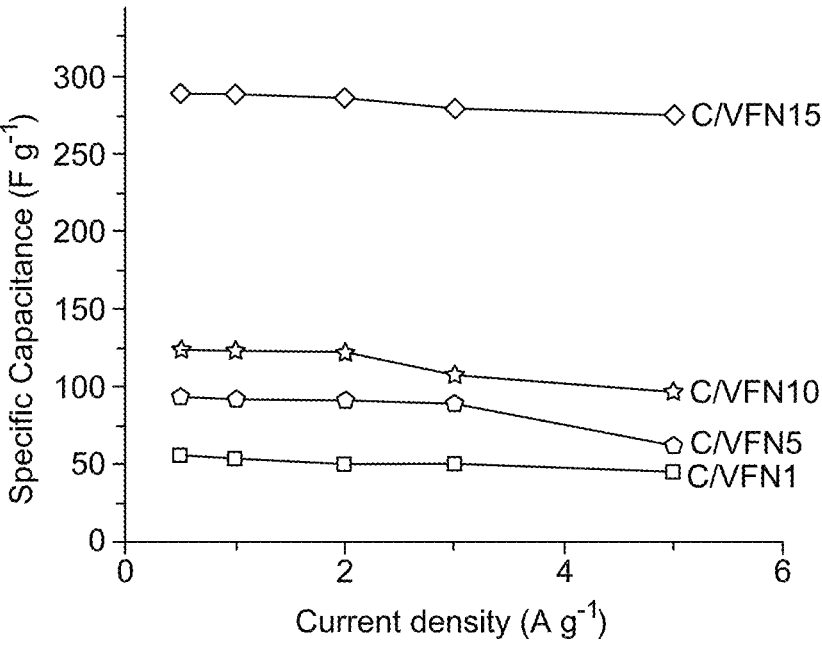
FIG. 12A is a plot of device-specific capacitances as a function of current density, according to certain embodiments of the present disclosure.

FIG. 12A illustrates specific capacitance of various devices of C/VFN1, C/VFN5, C/VFN10, and C/VFN15. Specific capacitances (Cs) of the supercapacitors were analyzed at different currents from 1 to 5 mA to investigate the rate effect on GCD. Non-linear profiles were used to evaluate Cs from the GCD equation (1).

$$Cs, cell = I \int V dt / w \times \Delta V, \qquad (1)$$

where the discharge curve area is $\int V dt$; operating voltage is $\Delta V$; w, and I are the total weight of active materials and discharge current, respectively.

The charge storage capacity of the devices was slightly diminished with the current density. This behavior can be described by the enhanced ion transport through the electrolyte and doped carbon electrodes by maintaining the specific capacity of the devices even at faster discharge rates. The device with C/VFN15 electrodes illustrated a specific capacitance of 290 F $g^{-1}$ at 1 A $g^{-1}$, which is better than the devices with C/VFN1 (53 F $g^{-1}$), C/VFN5 (98 F $g^{-1}$), and C/VFN10 (125 F $g^{-1}$).

Figure 12B:
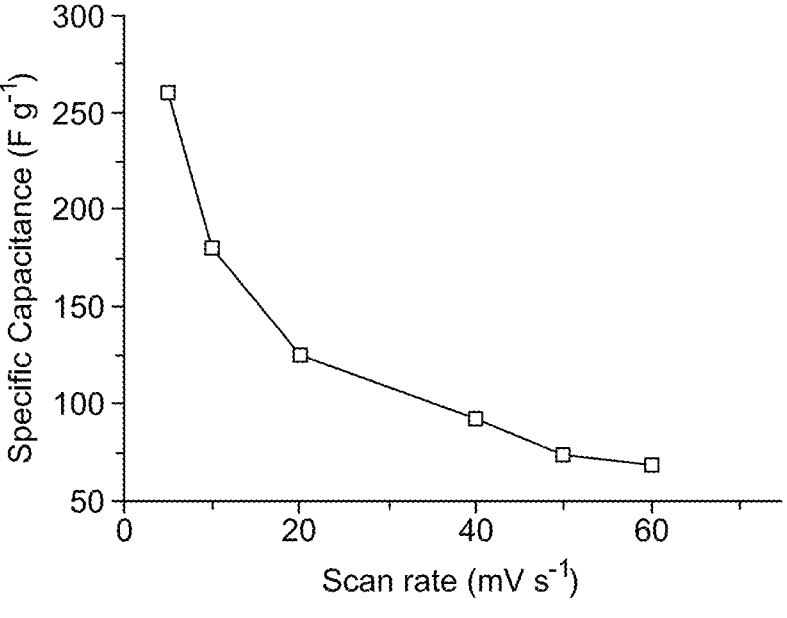
FIG. 12B is a plot of specific capacitance vs. scan rate, according to certain embodiments of the present disclosure.
Figure 12C:
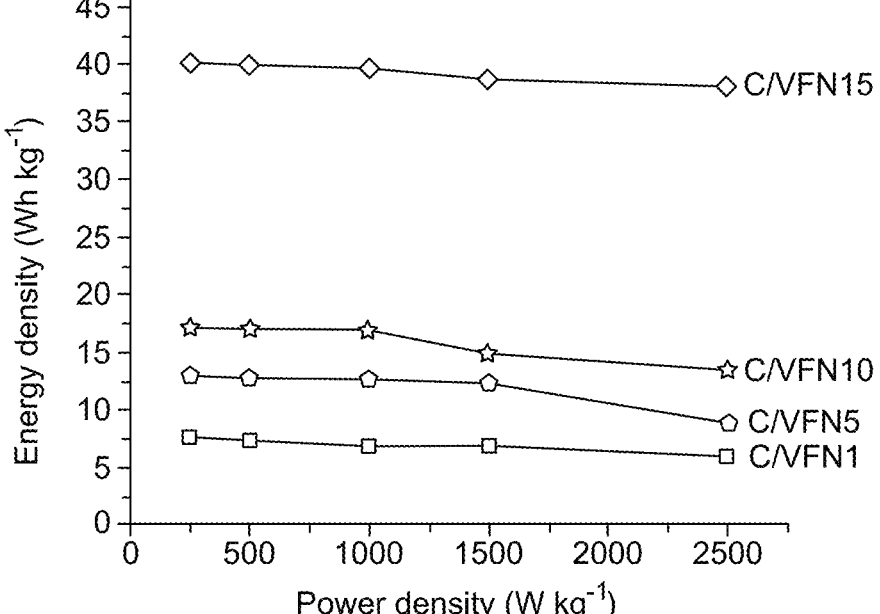
FIG. 12C is a Ragone plot of devices with the C/VFN1, C/VFN5, C/VFN10, and C/VFN15 electrodes, according to certain embodiments of the present disclosure.

The Cs parameter was further investigated by assessing the CV curves via equation (2) (FIG. 12B).

$$Cs, cell = \int I dv / v \times w \times \Delta V, \qquad (2)$$

where the area of the forward/reverse CV scan is $\int I dv$; v is the scan rate. The device was assessed to obtain energy and power densities (Ragone Plots) according to equations 3 and 4 (FIG. 12C).

$$E = \frac{1}{2w} \times Cs \times (\Delta V^2)/3.6, \qquad (3)$$

$$P = E \times (3600/\Delta t),$$

where E and P are the corresponding specific energy and specific power of the device.

The specific energy of 40 watt-hours per kilogram (Wh $kg^{-1}$) for the symmetric supercapacitor having C/VFN15 was reached at the corresponding specific power of 250 W $kg^{-1}$. At higher discharge rates, a slight decrease was noticed in the specific energy for the same device to 37 Wh $kg^{-1}$ at a power of 2500 W $kg^{-1}$. This result confirmed the high-performance device even at higher discharge rates.

Figure 12D:
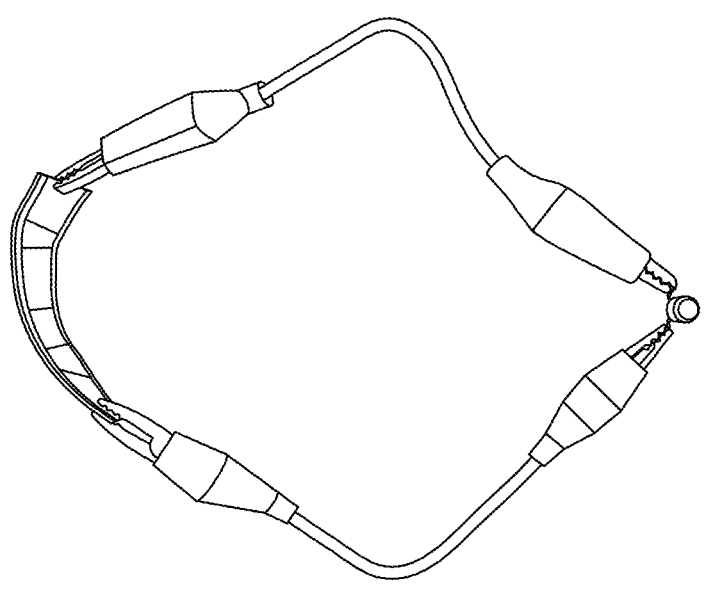
FIG. 12D is a supercapacitor performance during light-emitting diode (LED) lightening, according to certain embodiments of the present disclosure.
Figure 12E:
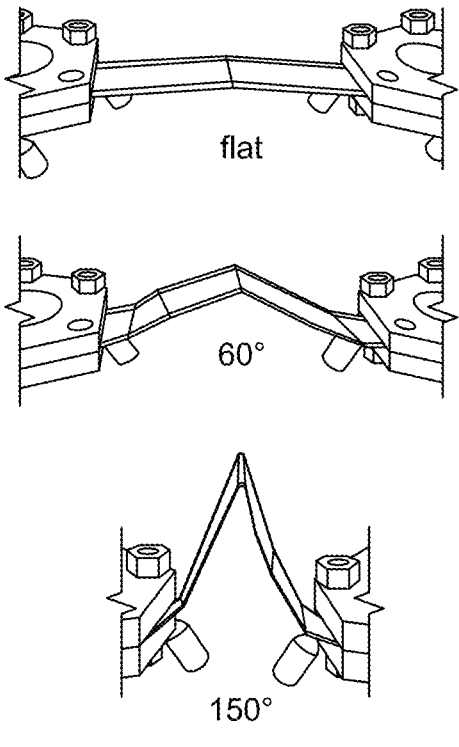
FIG. 12E is an image depicting device flexibility at various angles of flat, 60°, and 150°, according to certain embodiments of the present disclosure.
Figure 12F:
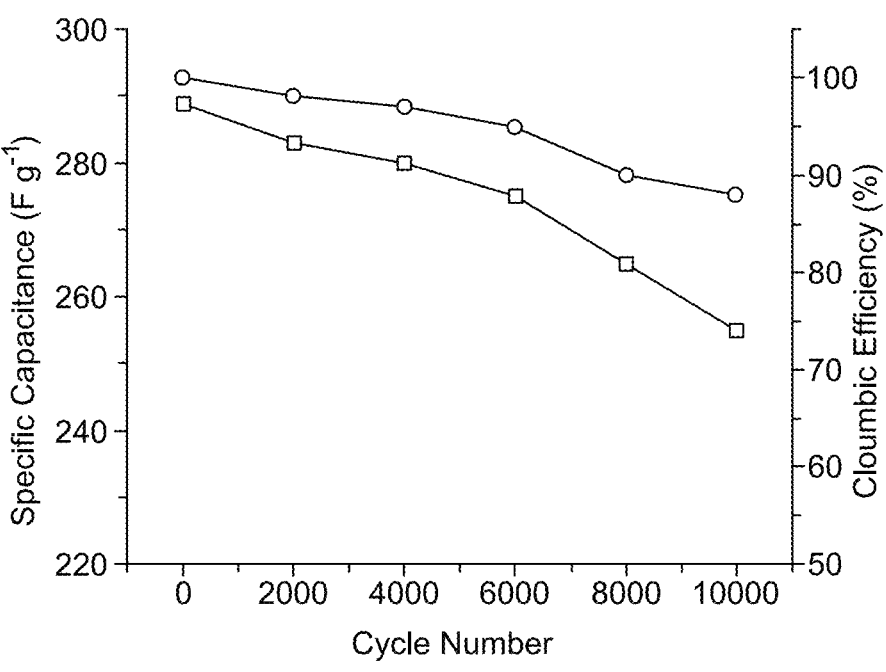
FIG. 12F is a graph depicting cyclic performance of the C/VFN15-based supercapacitor, according to certain embodiments of the present disclosure.

Practical use of the symmetrical supercapacitor with carbon composite electrode, including C/VFN15 active materials, was employed. A device with a length of 3 cm and a width of 1.5 cm was assembled and tested at various angles as a flexible energy storage device. The device at angles of flat, 60°, and 150° was successfully operated under the LED light (FIG. 12D and FIG. 12E). Additionally, the cycle performance of the device (C/VFN15) was further analyzed by 10.000 GCD cycles at a current density of 1 A $g^{-1}$ (FIG. 12F). The device electrodes with C/VFN15 active materials illustrated a performance with approximately 10% loss in the initial performance of the device after 10000 cycles. In addition, coulombic efficiency of around 90% was recorded for the same device at 10000 cycles.

Figure 12G:
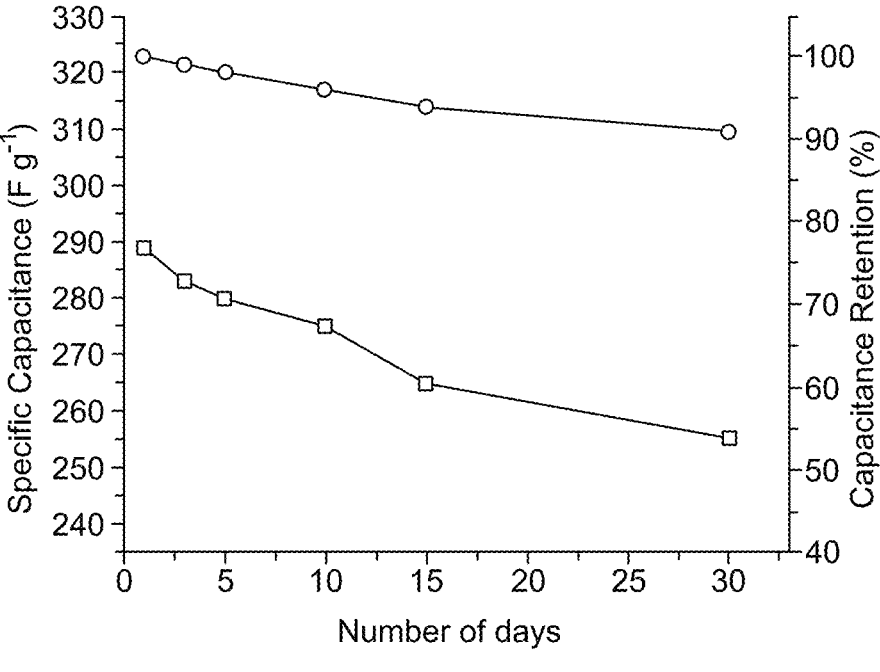
FIG. 12G is a graph depicting capacitance retention of the C/VFN15-based supercapacitor, according to certain embodiments of the present disclosure.
Figure 13:
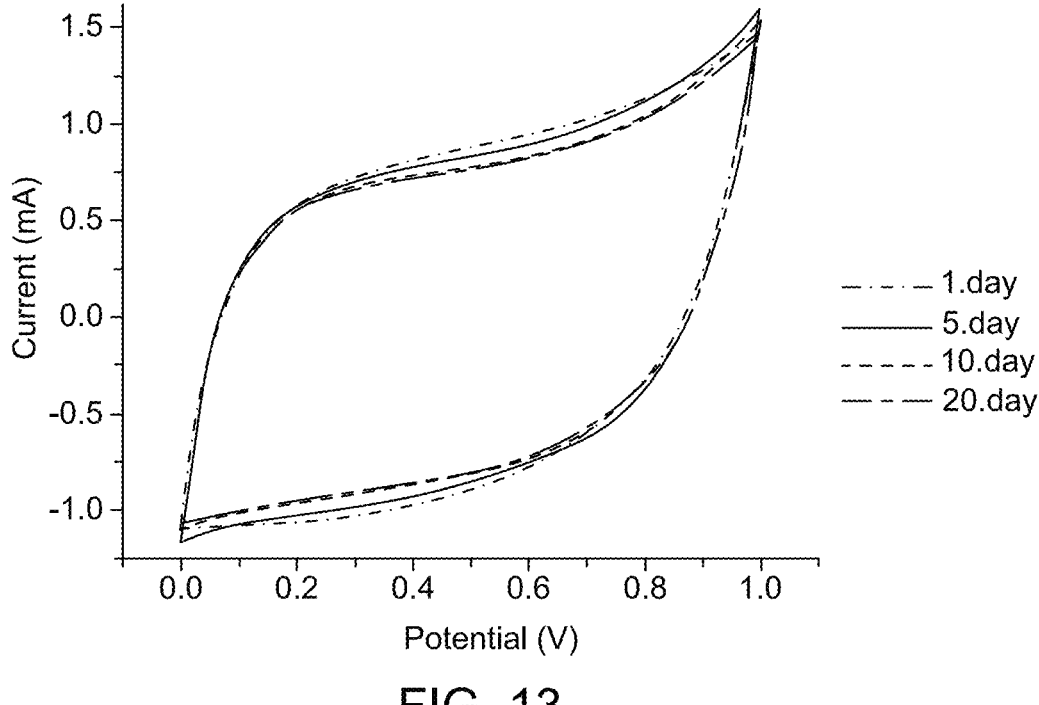
FIG. 13 is a graph depicting the CV of the device with the C/VFN15 at different periods, according to certain embodiments of the present disclosure.

The robustness of the device was tested by measuring the capacitance retention of the device via cycling for long periods. FIG. 12G shows Cs recorded per day for C/VFN15-based supercapacitor. The device with C/VFN15 represented no rapid decline in the Cs of the cell for 30 days, maintaining 90% of the capacitance. CV of the device with C/VFN15 at different periods. The stability of the same device with C/VFN15 was also confirmed by CV testing at different periods, as illustrated in FIG. 13.

Numerous modifications and variations of the present disclosure are possible in light of the above teachings. It is therefore to be understood that within the scope of the appended claims, the invention may be practiced otherwise than as specifically described herein.

The invention claimed is:

1. A supercapacitor device, comprising:
two symmetrically facing nanocomposite electrodes, wherein each nanocomposite electrode comprises:
a substrate;
a binding compound;
a conductive additive; and
$NiO/Fe_2VO_4$ nanoparticles,
wherein the $NiO/Fe_2VO_4$ nanoparticles have a substantially spherical shape,
wherein a mixture of the binding compound, the conductive additive and the $NiO/Fe_2VO_4$ nanoparticles is at least partially coated on a first surface of the substrate,
wherein the first surfaces of the nanocomposite electrodes coated with the mixture face inwards; and
wherein an anhydrous gel electrolyte is disposed between and is in contact with the first surfaces.

2. The supercapacitor of claim 1, wherein the $NiO/Fe_2VO_4$ nanoparticles have an average diameter of 1-20 nanometers (nm).

3. The supercapacitor of claim 1, wherein the $NiO/Fe_2VO_4$ nanoparticles are aggregated and have an average aggregate size of 1 to 50 micrometers (μm).

4. The supercapacitor of claim 1, wherein the $NiO/Fe_2VO_4$ nanoparticles are aggregated and form an interconnected chain.

5. The supercapacitor of claim 1, wherein the $NiO/Fe_2VO_4$ nanoparticles form an interconnected chain while dispersed in a matrix of the conductive additive.

6. The supercapacitor of claim 1, wherein the mixture comprises 5-10 wt. % of the binding compound, 70-90 wt. % of the conductive additive, and 1-20 wt. % of the $NiO/Fe_2VO_4$ nanoparticles, based on a total weight of the mixture.

7. The supercapacitor of claim 1, wherein the mixture comprises 70-90 wt. % C, 0.5-5 wt. % V, 1-10 wt. % Fe, and 1-10 wt. % Ni based on the total weight of the mixture.

8. The supercapacitor of claim 1, wherein the elements V, C, Fe, and Ni are homogeneously distributed on the first surface of the substrate.

9. The supercapacitor of claim 1, wherein the substrate is made from at least one material selected from the group consisting of stainless steel, aluminum, nickel, copper, platinum, zinc, tungsten, and titanium.

10. The supercapacitor of claim 1, wherein the conductive additive is at least one selected from the group consisting of graphite, activated carbon, reduced graphene oxide, carbon nanotubes, carbon nanofibers, and carbon black.

11. The supercapacitor of claim 1, wherein the binding compound is at least one selected from the group consisting of polyvinylidene fluoride (PVDF) and N-methyl pyrrolidone (NMP).

12. The supercapacitor of claim 1, wherein the first surface of the substrate is hydrophilic.

13. The supercapacitor of claim 1, wherein the first surface of the substrate has a water contact angle less than 37°.

14. The supercapacitor device of claim 1, wherein the electrolyte is a glycerol/KOH gel electrolyte.

15. The supercapacitor device of claim 1, having a specific capacitance of 250-300 Farad per gram (F/g) at a current density of 1-5 ampere per gram (A/g).

16. A battery, comprising 2-10 of the supercapacitor devices of claim 1 connected in parallel and/or series.

* * * * *